United States Patent
Tokunaga et al.

(10) Patent No.: US 11,109,108 B2
(45) Date of Patent: Aug. 31, 2021

(54) INFORMATION PROCESSING DEVICE

(71) Applicant: Sony Interactive Entertainment Inc., Tokyo (JP)

(72) Inventors: Nodoka Tokunaga, Tokyo (JP); Masaki Takase, Tokyo (JP); Yuji Takeuchi, Kanagawa (JP); Masahiro Fujihara, Tokyo (JP); Akira Miyashita, Tokyo (JP); Keigo Tamura, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 694 days.

(21) Appl. No.: 15/508,206

(22) PCT Filed: Aug. 12, 2015

(86) PCT No.: PCT/JP2015/072872
§ 371 (c)(1),
(2) Date: Mar. 2, 2017

(87) PCT Pub. No.: WO2016/067712
PCT Pub. Date: May 6, 2016

(65) Prior Publication Data
US 2017/0289633 A1   Oct. 5, 2017

(30) Foreign Application Priority Data

Oct. 27, 2014  (JP) .............................. JP2014-218503

(51) Int. Cl.
*H04N 21/4788* (2011.01)
*H04N 7/14* (2006.01)
(Continued)

(52) U.S. Cl.
CPC ....... *H04N 21/4788* (2013.01); *A63F 13/213* (2014.09); *A63F 13/655* (2014.09);
(Continued)

(58) Field of Classification Search
CPC ...... A63F 13/213; A63F 13/655; A63F 13/79; A63F 13/812; A63F 13/87;
(Continued)

(56) References Cited

U.S. PATENT DOCUMENTS 6,297,846 B1   10/2001  Enami
7,643,742 B2   1/2010   Watanabe
(Continued)

FOREIGN PATENT DOCUMENTS

JP      1051755 A      2/1998
JP   2001305642 A     11/2001
(Continued)

OTHER PUBLICATIONS

Office Action for corresponding JP Application No. 2014-218503, 7 pages, dated Nov. 14, 2017.
(Continued)

*Primary Examiner* — Tadesse Hailu
(74) *Attorney, Agent, or Firm* — Matthew B. Dernier, Esq.

(57) ABSTRACT

An imaged image obtaining section obtains an imaged image from a camera. A face recognizing section detects the face images of a plurality of users in the imaged image. A display user determining section has a function of determining a user to be included in a display image. When an instruction receiving section receives a changing instruction, the display user determining section changes a user included in the display image. A face image clipping section clips a region including the face image of the determined user from the imaged image. A display image generating section generates the display image including the clipped region.

11 Claims, 16 Drawing Sheets

(51) Int. Cl.

| | |
|---|---|
| *A63F 13/213* | (2014.01) |
| *A63F 13/812* | (2014.01) |
| *A63F 13/79* | (2014.01) |
| *A63F 13/655* | (2014.01) |
| *A63F 13/87* | (2014.01) |
| *H04N 21/4223* | (2011.01) |
| *H04N 21/478* | (2011.01) |
| *H04N 21/4402* | (2011.01) |
| *H04N 21/44* | (2011.01) |
| *H04N 21/4545* | (2011.01) |
| *G06T 11/60* | (2006.01) |
| *H04N 21/242* | (2011.01) |
| *H04N 21/24* | (2011.01) |

(52) U.S. Cl.
CPC ............ *A63F 13/79* (2014.09); *A63F 13/812* (2014.09); *A63F 13/87* (2014.09); *G06T 11/60* (2013.01); *H04N 7/147* (2013.01); *H04N 21/242* (2013.01); *H04N 21/4223* (2013.01); *H04N 21/4402* (2013.01); *H04N 21/44008* (2013.01); *H04N 21/45455* (2013.01); *H04N 21/4781* (2013.01); *H04N 21/2402* (2013.01)

(58) Field of Classification Search
CPC ............ H04N 21/4788; H04N 21/242; H04N 21/4223; H04N 21/44008; H04N 21/4402; H04N 21/45455; H04N 21/4781; H04N 21/2402
See application file for complete search history.

(56) References Cited

U.S. PATENT DOCUMENTS

| | | | |
|---|---|---|---|
| 7,865,075 B2 | 1/2011 | Watanabe | |
| 9,138,644 B2* | 9/2015 | Perlman | ................. A63F 13/12 |
| 2007/0098396 A1 | 5/2007 | Watanabe | |
| 2009/0135269 A1* | 5/2009 | Nozaki | .............. G06K 9/00221 |
| | | | 348/222.1 |
| 2009/0202114 A1* | 8/2009 | Morin | ...................... A63F 13/12 |
| | | | 382/118 |
| 2010/0091105 A1 | 4/2010 | Watanabe | |
| 2011/0217021 A1* | 9/2011 | Dubin | .................... H04N 7/147 |
| | | | 386/278 |
| 2012/0113281 A1* | 5/2012 | Kim | ................... H04N 5/23219 |
| | | | 348/220.1 |
| 2012/0295705 A1 | 11/2012 | Hanawa | |
| 2014/0304754 A1* | 10/2014 | Haot | .................... H04N 21/234 |
| | | | 725/110 |

FOREIGN PATENT DOCUMENTS

| | | |
|---|---|---|
| JP | 2008278458 A | 11/2008 |
| JP | 4832518 B2 | 12/2011 |
| JP | 2012034793 A | 2/2012 |
| JP | 2012239719 A | 12/2012 |
| JP | 2013115527 A | 6/2013 |
| JP | 2014155564 A | 8/2014 |
| JP | 2014191647 A | 10/2014 |

OTHER PUBLICATIONS

International Preliminary Report on Patentability and Written Opinion for corresponding PCT Application No. PCT/JP2015/072872, 11 pages, dated May 11, 2017.

Office Action for corresponding JP Application No. 2014-218503, 13 pages, dated May 8, 2018.

International Search Report for corresponding PCT Application No. PCT/JP2015/072872, 2 pages, dated Sep. 15, 2015.

* cited by examiner (a)

CAMERA VIDEO SETTING

POSITION | UPPER RIGHT ▶
SIZE | SMALL ▶
ASPECT RATIO | NORMAL ▶

BACKGROUND | DO NOT CHANGE ▶
EFFECT | NONE ▶

PREVIEW

ⓧ ENTER  ◯ RETURN

INFORMATION PROCESSING DEVICE

TECHNICAL FIELD

The present invention relates to a technology of distributing the camera video of a user.

BACKGROUND ART

Service for sharing moving images created or captured by users has recently spread. In addition, it has become possible for user terminals to be connected to each other on a peer-to-peer (P2P) basis to communicate with each other directly. Utilizing such mechanisms, users have become able to share various data with other users via the Internet. Patent Document 1 proposes a game distribution system in which a game device as a distribution source distributes information about play conditions of a game to a game device on a receiving side, and a user on the receiving side can participate in the game being executed by the game device as the distribution source.

CITATION LIST

Patent Literature

[PTL 1] JP 2012-34793 A

SUMMARY

Technical Problem

In moving image distribution service, a user may distribute the state of the user himself/herself photographed by a camera together with an image of a game played by the user. This distribution is so-called "face showing" distribution. When the user shows the face of the user, the user can shorten distances to viewers, and also win a larger number of viewers. There are thus needs for a technology of effectively performing "face showing" distribution.

It is accordingly an object of the present invention to provide a technology for distributing the state of a user effectively.

Solution to Problem

In order to solve the above problem, according to a mode of the present invention, there is provided an information processing device including: an image obtaining section configured to obtain an imaged image from an imaging device; a face recognizing section configured to detect face images of a plurality of users in the imaged image; a display user determining section configured to determine a user to be included in a display image; a face image clipping section configured to clip a region including the face image of the determined user from the imaged image; a display image generating section configured to generate the display image including the clipped region; and an instruction receiving section configured to receive an instruction. The display user determining section determines the user to be included in the display image on a basis of the instruction received by the instruction receiving section, and the face image clipping section clips the region including the face image of the determined user.

Another mode of the present invention is also an information processing device. This device includes: an image obtaining section configured to obtain an imaged image from an imaging device; a face recognizing section configured to detect face images of a plurality of users in the imaged image; an instruction receiving section configured to receive a predetermined voice command as a changing instruction of a user included in a display image; a display user determining section configured to determine a user to be included in the display image on a basis of the changing instruction; a face image clipping section configured to clip a region including the face image of the determined user from the imaged image; and a display image generating section configured to generate the display image including the clipped region.

It is to be noted that arbitrary combinations of the above constituent elements as well as modes obtained by converting expressions of the present invention between a method, a device, a system, a recording medium, a computer program, and the like are also effective as modes of the present invention.

BRIEF DESCRIPTION OF DRAWINGS

FIG. 8 is a diagram illustrating an example of a screen for setting a mode of superimposition of camera video.

DESCRIPTION OF EMBODIMENT

Figure 1:
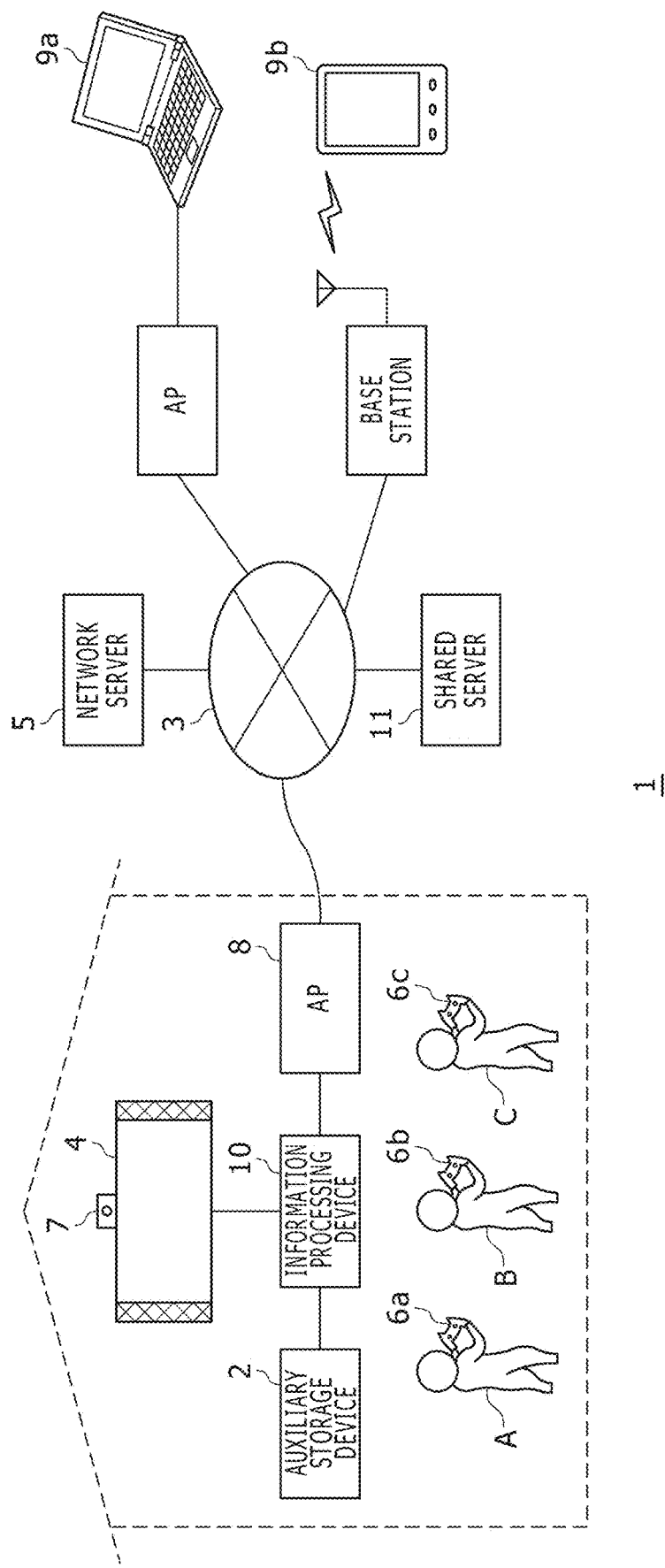
FIG. 1 is a diagram illustrating an information processing system according to an embodiment of the present invention.

FIG. 1 illustrates an information processing system 1 according to an embodiment of the present invention. The information processing system 1 realizes an environment in which a user as a distributor performs live distribution of a game image during play and another viewing user views the game image. The information processing system 1 includes an information processing device 10 used by the distributing user, a network server 5, a shared server 11, and various kinds of terminal devices 9a and 9b. The information processing device 10, the network server 5, the shared server 11, and the terminal devices 9a and 9b are connected to one another via a network 3 such as the Internet, a local area network (LAN), a telephone network, or the like. An access point (hereinafter referred to as "AP") 8 has functions of a wireless access point and a router. The information processing device 10 is connected to the AP 8 via radio or wire to be communicatably connected to the network server 5 and the shared server 11 on the network 3.

The information processing device 10 is connected to an input device 6 operated by the user by radio or by wire. The input device 6 outputs information about an operation of the user to the information processing device 10. When the information processing device 10 receives the operation information from the input device 6, the information processing device 10 reflects the operation information in processing of system software or application software, and outputs a result of the processing from an output device 4. In the information processing system 1, the information processing device 10 may be a game device that executes a game, and the input device 6 may be a device such as a game controller or the like that supplies the user operation information to the information processing device 10. The information processing device 10 performs streaming distribution of game image data during play to the terminal devices 9a and 9b. Hence, the information processing system 1 in the embodiment operates as a game image distribution system.

The network server 5 provides game network service to the user of the information processing device 10. The network server 5 manages a network account identifying the user. The user signs in to the network service provided by the network server 5 using the network account. When the user signs in to the network service from the information processing device 10, the user can register, in the network server 5, the save data of the game as well as a virtual prize (trophy) obtained during game play.

In the present example, three users A, B, and C are playing the game together on the information processing device 10. The user A operates an input device 6a. The user B operates an input device 6b. The user C operates an input device 6c. The output device 4 displays a game image during the play. This game image is distributed to the terminal devices 9a and 9b of viewing users through the shared server 11. FIG. 1 illustrates a state in which the terminal device 9a is a personal computer and is connected to the network 3 via an AP, and the terminal device 9b is a mobile apparatus such as a smart phone or the like and is connected to the network 3 via a base station. However, the viewing users may receive the distributed game image by terminal devices identical to the information processing device 10. Incidentally, in another example, the information processing device 10 and the terminal devices may be connected to each other by P2P to transmit and receive data to and from each other. The terminals of the viewing users will hereinafter be referred to collectively as "terminal devices 9" unless particularly distinguished from each other.

An auxiliary storage device 2 is a mass storage device such as a hard disk drive (HDD), a flash memory, or the like. The auxiliary storage device 2 may be an external storage device connected to the information processing device 10 by a universal serial bus (USB) or the like, or may be an internal storage device. The output device 4 may be a television set including a display for outputting an image and a speaker for outputting sound, or may be a computer display. The output device 4 may be connected to the information processing device 10 by a wire cable, or may be connected to the information processing device 10 by radio.

The input device 6 includes a plurality of input units such as a plurality of push type operating buttons, an analog stick enabling the input of an analog quantity, a rotary button, and the like. A camera 7 as an imaging device is disposed in the vicinity of the output device 4 to image a space around the output device 4. FIG. 1 illustrates an example in which the camera 7 is attached to an upper portion of the output device 4. However, the camera 7 may be disposed on a side of the output device 4. In either case, the camera 7 is disposed in such a position as to be able to image the users A, B, and C playing the game in front of the output device 4. The camera 7 may be a stereo camera. In the information processing system 1, camera image data obtained by photographing the users is distributed to the terminal devices 9 of the viewing users in real time together with the game image data of the game played by the users. Incidentally, the camera image is synthesized by being superimposed on the game image, or the camera image is synthesized so as not to be superimposed on the game image. The synthesized image data is distributed to the terminal devices 9.

A button configuration of the input device 6 will be described.

Configuration of Upper Surface Portion

Figure 2:
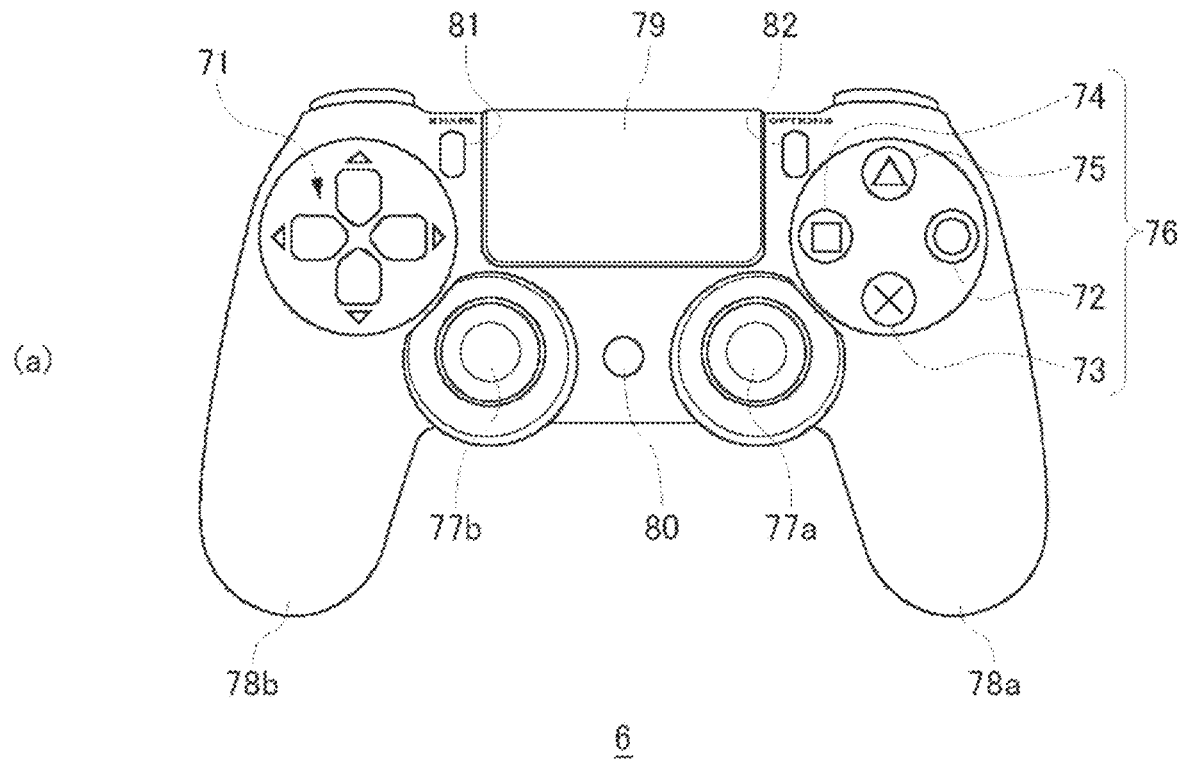
FIG. 2 is a diagram illustrating external constitutions of an input device.
Figure 2:
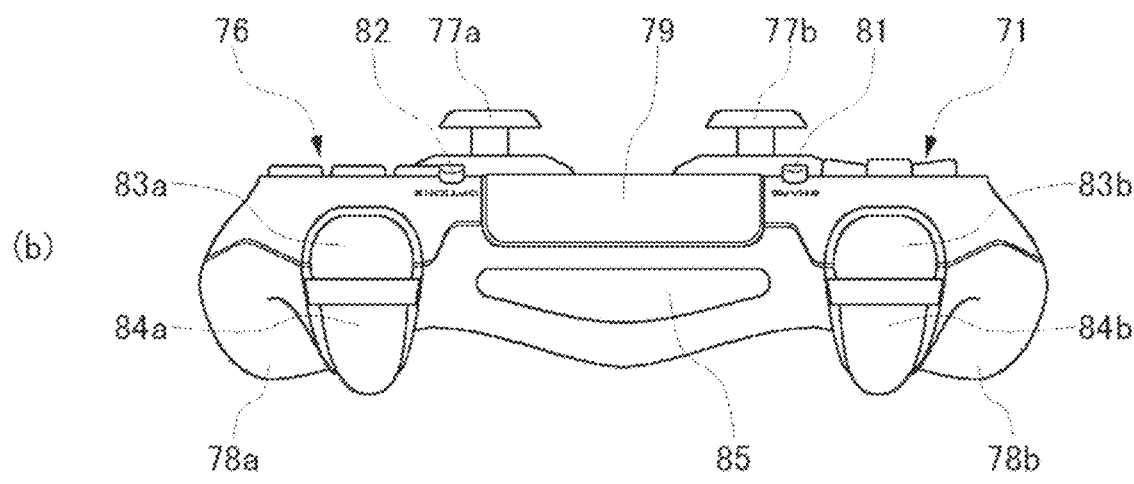

FIG. 2(a) illustrates an external constitution of an upper surface of the input device. The user operates the input device 6 while holding a left grip portion 78b with a left hand and holding a right grip portion 78a with a right hand. The upper surface of a casing of the input device 6 is provided with direction keys 71, analog sticks 77a and 77b, and four kinds of operating buttons 76 as input units. A touch pad 79 is provided in a flat region between the direction keys 71 and the operating buttons 76 on the upper surface of the casing. The touch pad 79 also functions as a depression type button that sinks downward when pressed by the user and which returns to an original position when released by the user.

A function button 80 is provided between the two analog sticks 77a and 77b. The function button 80 is used to turn on power to the input device 6 and simultaneously activate a communication function that connects the input device 6 and the information processing device 10 to each other. After the input device 6 is connected to the information processing device 10, the function button 80 is also used to display a home screen on the information processing device 10.

A SHARE button 81 is provided between the touch pad 79 and the direction keys 71. The SHARE button 81 is used to input an instruction from the user to an operating system (OS) or system software in the information processing device 10. An OPTIONS button 82 is provided between the touch pad 79 and the operating buttons 76. The OPTIONS button 82 is used to input an instruction from the user to an application (game) executed in the information processing device 10. The SHARE button 81 and the OPTIONS button 82 may each be formed as a push type button.

Constitution of Side Surface Portion on Back Side

FIG. 2(b) illustrates an external constitution of a side surface on a back side of the input device. On an upper side of the side surface on the back side of the casing of the input device 6, the touch pad 79 is extended from the upper surface of the casing. A horizontally long light emitting portion 85 is provided on a lower side of the side surface on the back side of the casing. The light emitting portion 85 has a red (R) light emitting diode (LED), a green (G) LED, and a blue (B) LED. The light emitting portion 85 illuminates according to light emission color information transmitted from the information processing device 10. When the three input devices 6a, 6b, and 6c are used as illustrated in FIG. 1, the information processing device 10 may set different colors, or blue, red, and green, as respective lighting colors of the light emitting portions 85 of the input devices 6a, 6b, and 6c so that the users A, B, and C can distinguish the respective input devices 6. Each user can thereby recognize the input device 6 that the user is using by the lighting color of the light emitting portion 85. A possibility of the user mistaking the input device 6 is therefore reduced.

On the side surface on the back side of the casing, an upper side button 83a, a lower side button 84a, an upper side button 83b, and a lower side button 84b are disposed at left and right positions symmetric in a longitudinal direction. The upper side button 83a and the lower side button 84a are operated by an index finger and a middle finger, respectively, of the right hand of the user. The upper side button 83b and the lower side button 84b are operated by an index finger and a middle finger, respectively, of the left hand of the user. As illustrated in FIG. 2(b), the light emitting portion 85 is disposed between a line of the upper side button 83a and the lower side button 84a on the right side and a line of the upper side button 83b and the lower side button 84b on the left side. Therefore the light emitting portion 85 is not hidden by the index fingers or the middle fingers operating the respective buttons. The camera 7 can thus image the illuminating light emitting portion 85 ideally. The upper side button 83 may be configured as a push type button. The lower side button 84 may be configured as a rotatably supported trigger type button.

Figure 3:
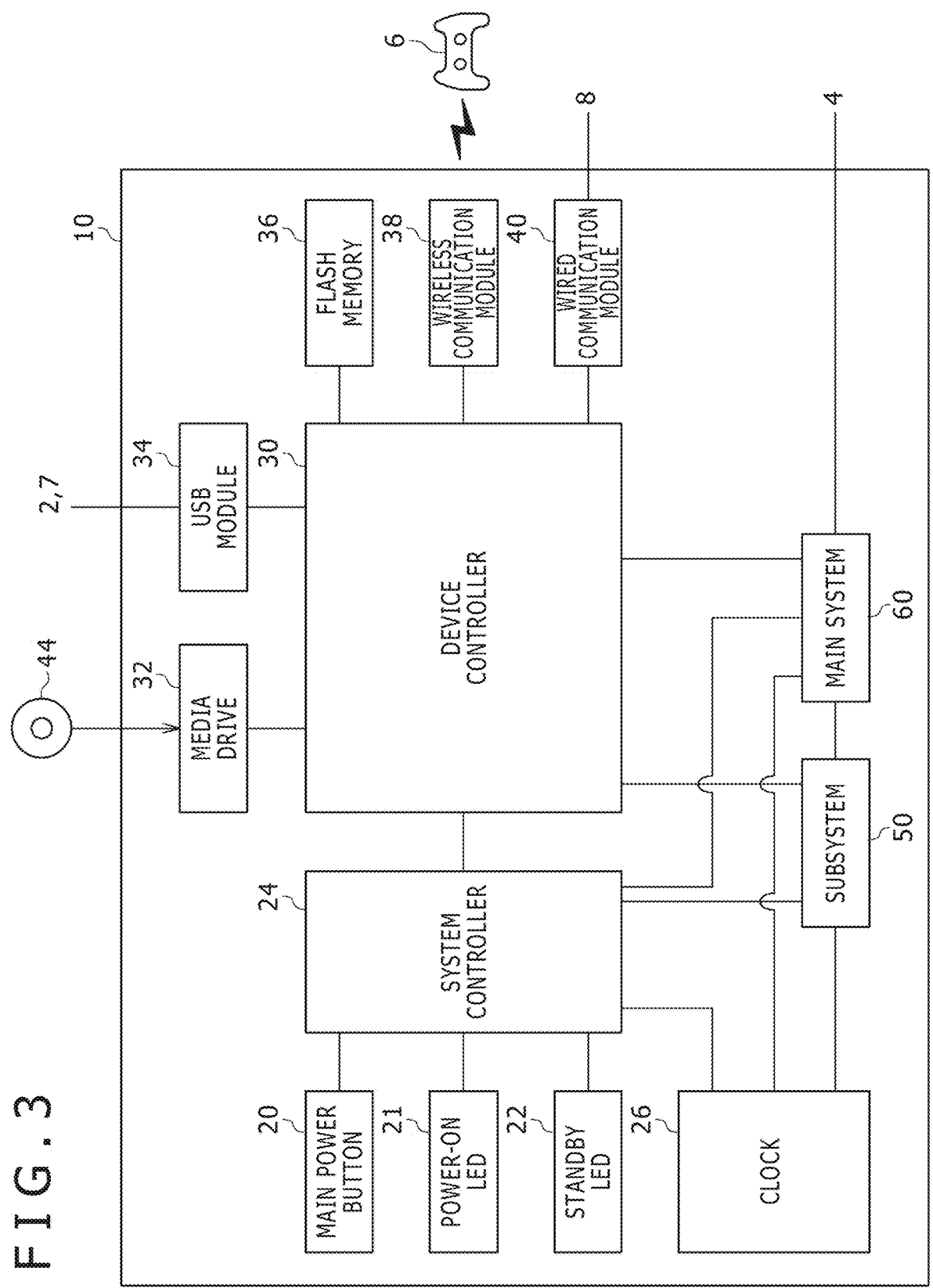
FIG. 3 is a diagram illustrating functional blocks of an information processing device.

FIG. 3 illustrates functional blocks of the information processing device 10. The information processing device 10 includes a main power button 20, a power-on LED 21, a standby LED 22, a system controller 24, a clock 26, a device controller 30, a media drive 32, a USB module 34, a flash memory 36, a wireless communication module 38, a wire communication module 40, a subsystem 50, and a main system 60.

The main system 60 includes a main central processing unit (CPU), a memory as a main storage device and a memory controller, a graphics processing unit (GPU), and the like. The GPU is used mainly for arithmetic processing of a game program. The main CPU has a function of starting the OS and executing an application installed in the auxiliary storage device 2 under an environment provided by the OS. The subsystem 50 includes a sub-CPU, a memory as a main storage device and a memory controller, and the like. The subsystem 50 does not include a GPU.

The main CPU has a function of executing a game program installed in the auxiliary storage device 2 or on a ROM medium 44, whereas the sub-CPU does not have such a function. However, the sub-CPU has a function of accessing the auxiliary storage device 2 and a function of transmitting and receiving data to and from the network server 5. The sub-CPU is configured to have only such limited processing functions, and is therefore able to operate with lower power consumption than the main CPU. These functions of the sub-CPU are performed when the main CPU is in a standby state. Because the subsystem 50 is operating during the standby period of the main system 60, the information processing device 10 according to the embodiment always maintains a state of signing in to the network service provided by the network server 5.

The main power button 20 is an input section to which an operating input from the user is performed. The main power button 20 is provided to a front surface of a casing of the information processing device 10. The main power button 20 is operated to turn on or off the supply of power to the main system 60 of the information processing device 10.

The power-on LED 21 is lit when the main power button 20 is turned on. The standby LED 22 is lit when the main power button 20 is turned off. The system controller 24 detects the depression of the main power button 20 by the user.

The clock 26 is a real-time clock. The clock 26 generates present date and time information, and supplies the present date and time information to the system controller 24, the subsystem 50, and the main system 60.

The device controller 30 is configured as a large-scale integrated circuit (LSI) that transfers information between devices like a Southbridge. As illustrated in the figure, the device controller 30 is connected with devices such as the system controller 24, the media drive 32, the USB module 34, the flash memory 36, the wireless communication module 38, the wire communication module 40, the subsystem 50, the main system 60, and the like. The device controller 30 accommodates differences between electrical characteristics of the respective devices and differences between data transfer rates, and controls data transfer timing.

The media drive 32 is a drive device that is loaded with and drives a ROM medium 44 on which application software such as a game or the like and license information are recorded, and which reads a program, data, and the like from the ROM medium 44. The ROM medium 44 is a read-only recording medium such as an optical disk, a magneto-optical disk, a Blu-ray disk, or the like.

The USB module 34 is a module connected to an external device by a USB cable. The USB module 34 may be connected to the auxiliary storage device 2 and the camera 7 by a USB cable. The flash memory 36 is an auxiliary storage device forming an internal storage. The wireless communication module 38 performs wireless communication with the input device 6, for example, under a communication protocol such as a Bluetooth (registered trademark) protocol, an Institute of Electrical and Electronic Engineers 802.11 (IEEE802.11) protocol, or the like. Incidentally, the wireless communication module 38 may support a third-generation (3rd Generation) digital mobile telephone system compliant with an International Mobile Telecommunication 2000 (IMT-2000) standard defined by the International Telecommunication Union (ITU), or may further support a digital mobile telephone system of another generation. The wire communication module 40 performs wire communication with an external device. The wire communication module 40 is connected to the network 3 via the AP 8, for example.

Figure 4:
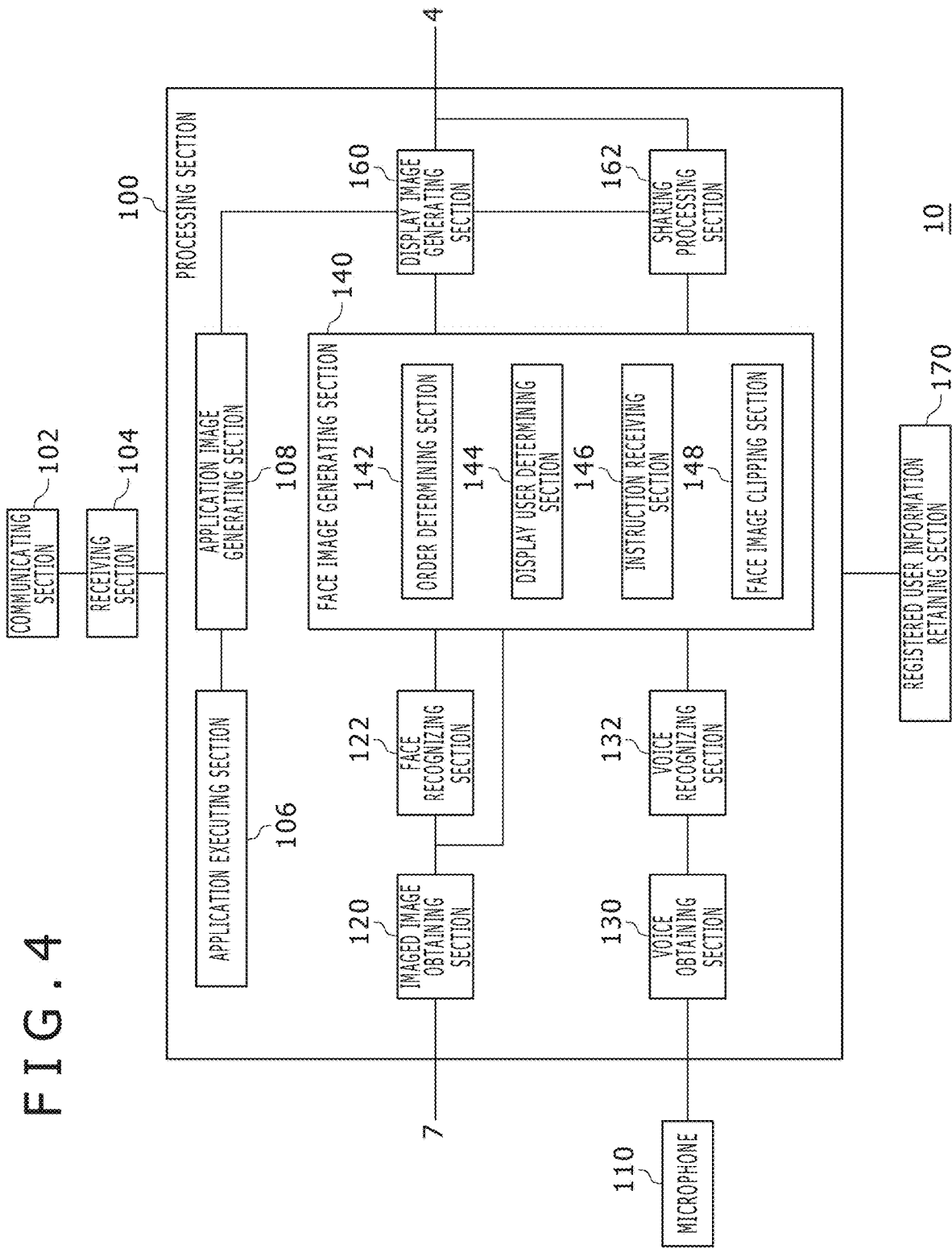
FIG. 4 is a diagram illustrating a configuration of the information processing device.

FIG. 4 illustrates a configuration of the information processing device 10 that operates as a streaming data distributing device. The information processing device 10 includes a processing section 100, a communicating section 102, a receiving section 104, a microphone 110, and a registered user information retaining section 170. The processing section 100 includes an application executing section 106, an application image generating section 108, an imaged image obtaining section 120, a face recognizing section 122, a voice obtaining section 130, a voice recognizing section 132, a face image generating section 140, a display image generating section 160, and a sharing processing section 162. The face image generating section 140 includes an order determining section 142, a display user determining section 144, an instruction receiving section 146, and a face image clipping section 148.

The elements described as functional blocks performing various processing in FIG. 4 can be configured by a circuit block, a memory, or another LSI in terms of hardware, and are implemented by a program loaded in memory or the like in terms of software. Hence, it is to be understood by those skilled in the art that these functional blocks can be implemented in various forms by only hardware, only software, or combinations of hardware and software, and are not limited to any one of the forms.

The communicating section 102 receives the operation information of the input device 6, and distributes content generated by the processing section 100 to the other terminal devices 9 via the shared server 11. The users of the terminal devices 9 can access the shared server 11 connected to the network 3, and view the content distributed from the information processing device 10. The content in this case is the game image of the game played by the users A, B, and C. The communicating section 102 is represented as a configuration combining the functions of the wireless communication module 38 and the wire communication module 40 illustrated in FIG. 3. Incidentally, the communicating section 102 may directly distribute the content to the other terminal devices 9.

The receiving section 104 is disposed between the communicating section 102 and the processing section 100. The receiving section 104 transmits data or information between the communicating section 102 and the processing section 100. When the receiving section 104 receives the operation information of the input device 6 via the communicating section 102, the receiving section 104 supplies the operation information to the application executing section 106, the face image generating section 140, the sharing processing section 162, or the like in the processing section 100. In addition, the receiving section 104 receives content from the display image generating section 160, and provides the content to the communicating section 102.

The registered user information retaining section 170 is formed in a storage area of the auxiliary storage device 2, and retains various information related to the user registered in the information processing device 10. Specifically, the registered user information retaining section 170 retains, as registered user information, a passcode for login, a sign-in identification (ID) for signing in to the network server 5, a network account, an online ID of the user (user name on the network), a user icon for representing the user, and the like in association with a user account. As for a registered user whose face image is registered in advance for face recognition processing, the registered user information retaining section 170 retains face identifying data as registered user information in association with the user account.

The face identifying data in this case is feature quantity data of the face image of the registered user, but may be face image data itself. The face identifying data is set as an object of comparison in face recognition processing by the face recognizing section 122, and is generated according to a face recognition algorithm adopted by the face recognizing section 122. The face identifying data may be for example data obtained by extracting, as features, the relative positions and sizes of parts of a face and the shapes of eyes, a nose, a cheekbone, and a chin. In addition, the face identifying data may be data extracted as difference data from face image standard data. Which kind of face identifying data to extract is determined by the adopted face recognition algorithm. In the embodiment, the face recognizing section 122 adopts a known face recognition algorithm. Incidentally, the face identifying data of a registered user whose face image is not registered is not included in the registered user information retaining section 170, of course.

In the embodiment, the application executing section 106 executes a game program. The application executing section 106 performs arithmetic processing that moves game characters in a virtual space on the basis of operation information input to the input devices 6a to 6c from the respective users A to C. The application executing section 106 in this case may be the application (game program) itself. The application image generating section 108 may be the graphics processing unit (GPU) that performs rendering processing or the like. The application image generating section 108 receives a result of the processing by the application executing section 106, and generates image data of the application (game). The display image generating section 160 outputs a game image generated by the application image generating section 108 before sharing processing to be described later is started from the output device 4 as it is as a display image.

Figure 5:
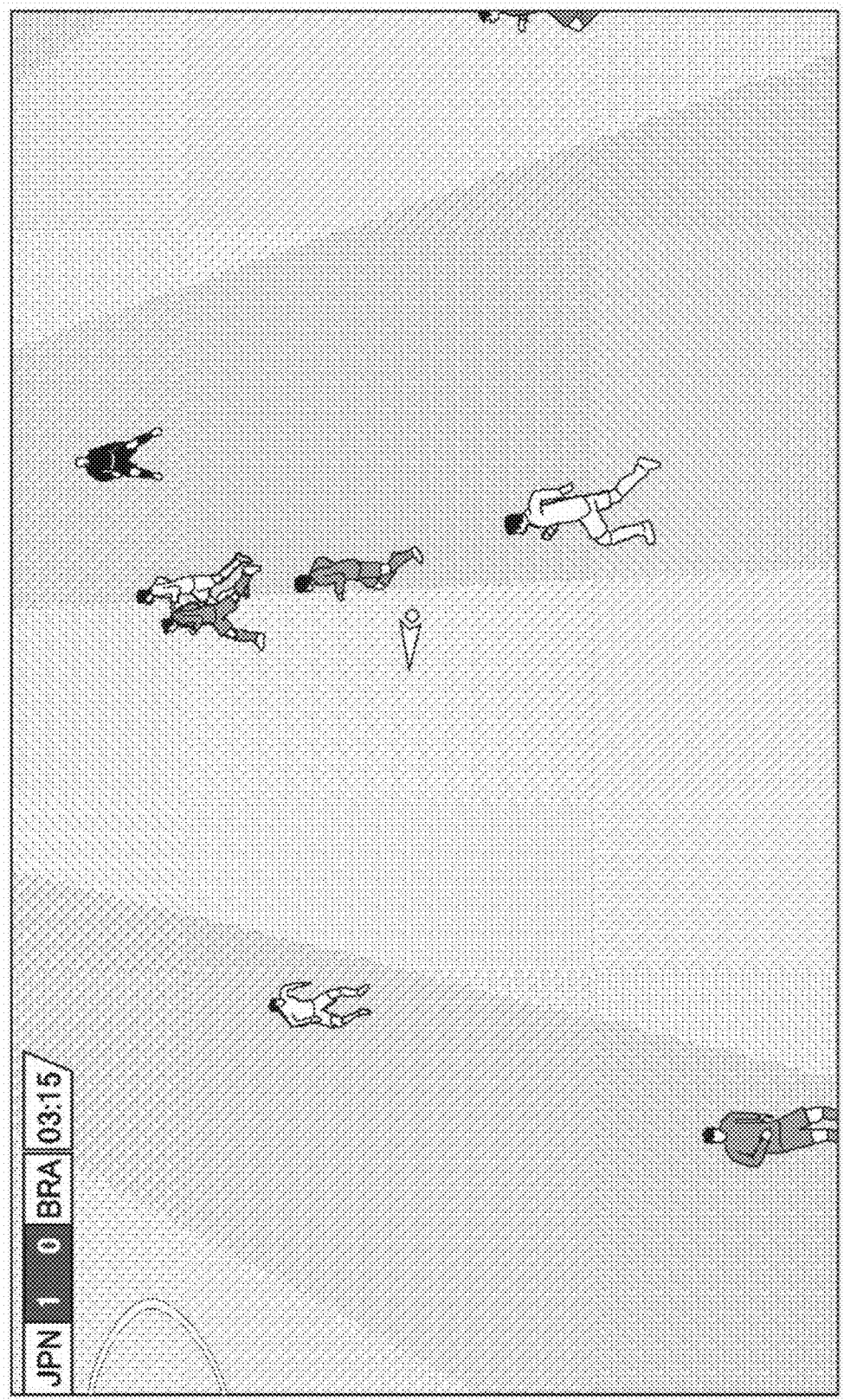
FIG. 5 is a diagram illustrating an example of a game screen.

FIG. 5 illustrates an example of a game screen displayed on the output device 4. In the present example, the users A to C are enjoying a soccer game together. Incidentally, the application executing section 106 may execute applications other than games, and the application image generating section 108 may generate application image data of other than games.

The sharing processing section 162 in the embodiment implements a function for sharing the game image data generated by the application image generating section 108 with other users. This sharing processing is triggered when one of the users A to C performing game play on the information processing device 10 operates a specific input unit provided to the own input device 6 of the user, or the SHARE button 81 in this case. The sharing processing in this case means that a screen displayed on the output device 4 is set in a state of being viewable by the other users on the terminal devices 9, or is actually viewed by the other users on the terminal devices 9. The following description will be made of a case where the user A operates the SHARE button 81 of the input device 6a.

When the receiving section 104 receives information about the operation of the SHARE button 81 from the input device 6a of the user A during game play, the sharing processing section 162 performs processing for sharing the game image data generated by the application image generating section 108 with other users. The sharing processing section 162 first generates an input image illustrating options related to the sharing of the image data.

Figure 6:
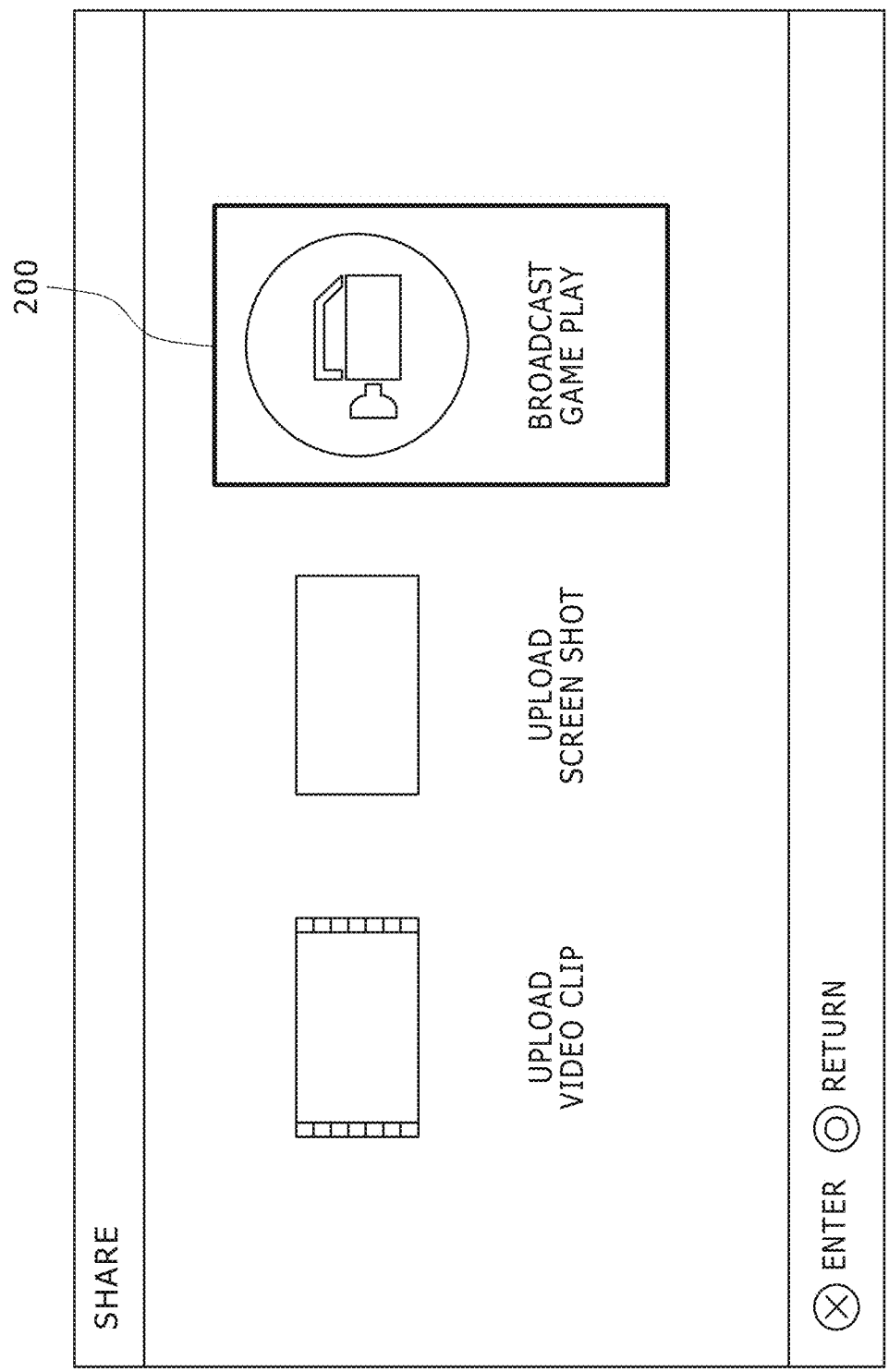
FIG. 6 is a diagram illustrating an example of an input screen illustrating options of sharing processing.

FIG. 6 illustrates an example of an input screen illustrating the options of the sharing processing. This input screen displays three options related to content sharing. "UPLOAD VIDEO CLIP" is a graphical user interface (GUI) specifying uploading the image data recorded in the auxiliary storage device 2 to the shared server 11. "UPLOAD SCREEN SHOT" is a GUI specifying uploading image data of a screenshot to the shared server 11. "BROADCAST GAME PLAY" is a GUI specifying live relay of play video of the game via the shared server 11. The user A moves a frame 200 by operating the input device 6a, selects one of the GUIs, and presses an ENTER button. The selected sharing processing is thereby performed.

Figure 7:
FIG. 7 is a diagram illustrating an example of a setting screen.

FIG. 7 illustrates an example of a setting screen displayed when "BROADCAST GAME PLAY" is selected. This setting screen includes items for setting a mode of broadcast. In the embodiment, the user A at least agrees to "INCLUDE CAMERA VIDEO IN BROADCAST," and the video of the camera 7 is distributed together with the play video of the game. When "INCLUDE CAMERA VIDEO IN BROADCAST" is selected, the display image generating section 160 generates a display image in which the game screen and the camera video are synthesized with each other and outputs the display image from the output device 4, and the sharing processing section 162 encodes the display image generated by the display image generating section 160 and distributes the display image as a distribution image. Hence, the sharing processing distributes the same screen as the screen viewed by the playing users to viewing users. Incidentally, while the game image is shared via the shared server 11 in the embodiment, the game image may be distributed to the terminal devices 9 by P2P.

The display image generating section 160 generates a display image in which the game image is disposed in a first region and the camera image is disposed in a second region. As will be described in the following, the display image generating section 160 may set the second region within the first region, and may set the first region and the second region such that the first region and the second region are not superimposed on each other. The position in which to set the second region with respect to the first region depends on a mode of distribution of the camera video.

The sharing processing section 162 allows the user to select the mode of distribution of the camera video. When the user selects "DISPLAY COMMENT ON SCREEN" on the setting screen illustrated in FIG. 7, a comment display section is created in a position not superimposed on the game screen. That is, in the display image generated by the display image generating section 160, the game screen is displayed in a slightly reduced state, and the camera video and the comment display section are arranged in a margin part formed by reducing the game screen. Incidentally, when the user selects "DISPLAY COMMENT ON SCREEN," "SET MODE OF SUPERIMPOSITION OF CAMERA VIDEO" is displayed in a grayed-out state so as not to be selectable. When the user does not select "DISPLAY COMMENT ON SCREEN," on the other hand, the camera video is displayed in a state of being superimposed on the game screen displayed full-screen. In this case, the display image generating section 160 disposes the game image in the first region set as a full screen, and displays the camera video in the second region within the first region.

When the user selects "SET MODE OF SUPERIMPOSITION OF CAMERA VIDEO" in a state in which "DISPLAY COMMENT ON SCREEN" is not selected, the sharing processing section 162 displays, on the output device 4, a setting screen for allowing the user to set a mode of superimposition of the camera video.

FIG. 8 illustrates an example of a screen for setting a mode of superimposition of the camera video. The setting screen allows selection of at least a position, a size, and an aspect ratio in which to embed the camera video within the game screen. A preview screen displays the camera video according to a selected position, a selected size, and a selected aspect ratio. Thus, when the camera video is superimposed on the game screen, the camera video is embedded in a partial region of the game screen displayed full-screen. As an example, four positions, that is, an upper right, a lower right, an upper left, and a lower left may be prepared as options of "POSITION," three sizes, that is, a small size, a medium size, and a large size may be prepared as options of "SIZE," and two aspect ratios, that is, a normal aspect ratio and a wide aspect ratio may be prepared as options of "ASPECT RATIO." Incidentally, the aspect ratio represents the aspect ratio of the camera video. As an example, a 1:1 camera video frame having a 1:1 aspect ratio is set in the case of the "NORMAL" aspect ratio, and a camera video frame having a 9:16 aspect ratio is set in the case of the "WIDE" aspect ratio.

In addition, the setting screen provides options of modes of manipulation of the camera video. Items of "BACKGROUND" and "EFFECT" are prepared as the manipulation modes. The "BACKGROUND" item allows the user to select whether or not to change the background of the user included in the camera video. The "EFFECT" item allows the user to select whether or not to apply an effect to the camera video, and select which effect to apply when applying the effect. Incidentally, when "DO NOT CHANGE" is set for the "BACKGROUND" item, and "NONE" is set for the "EFFECT" item, the clipped camera video of the user is embedded in the game screen as it is.

When the user presses the ENTER button, a return is made to the setting screen illustrated in FIG. 7. The mode of distribution of the camera video which mode is set by the user is provided to the display image generating section 160. The display image generating section 160 generates a display image in which the camera video is embedded in the game screen according to this distribution mode. Incidentally, the user may be allowed to call up the setting screen illustrated in FIG. 8 by operating the function button 80 even after a start of the sharing processing, and reset the mode of superimposition of the camera video during the sharing processing. In the following example, description will be made of a case where the user selects superimposition of the camera video in an upper right region of the game screen.

When the user places a frame 202 at "START BROADCAST" on the setting screen illustrated in FIG. 7 and presses the ENTER button, the receiving section 104 notifies a start of broadcast to the sharing processing section 162. Returning to FIG. 4, when the sharing processing by the sharing processing section 162 is started, face recognition processing by the face recognizing section 122 is started.

Figure 9:
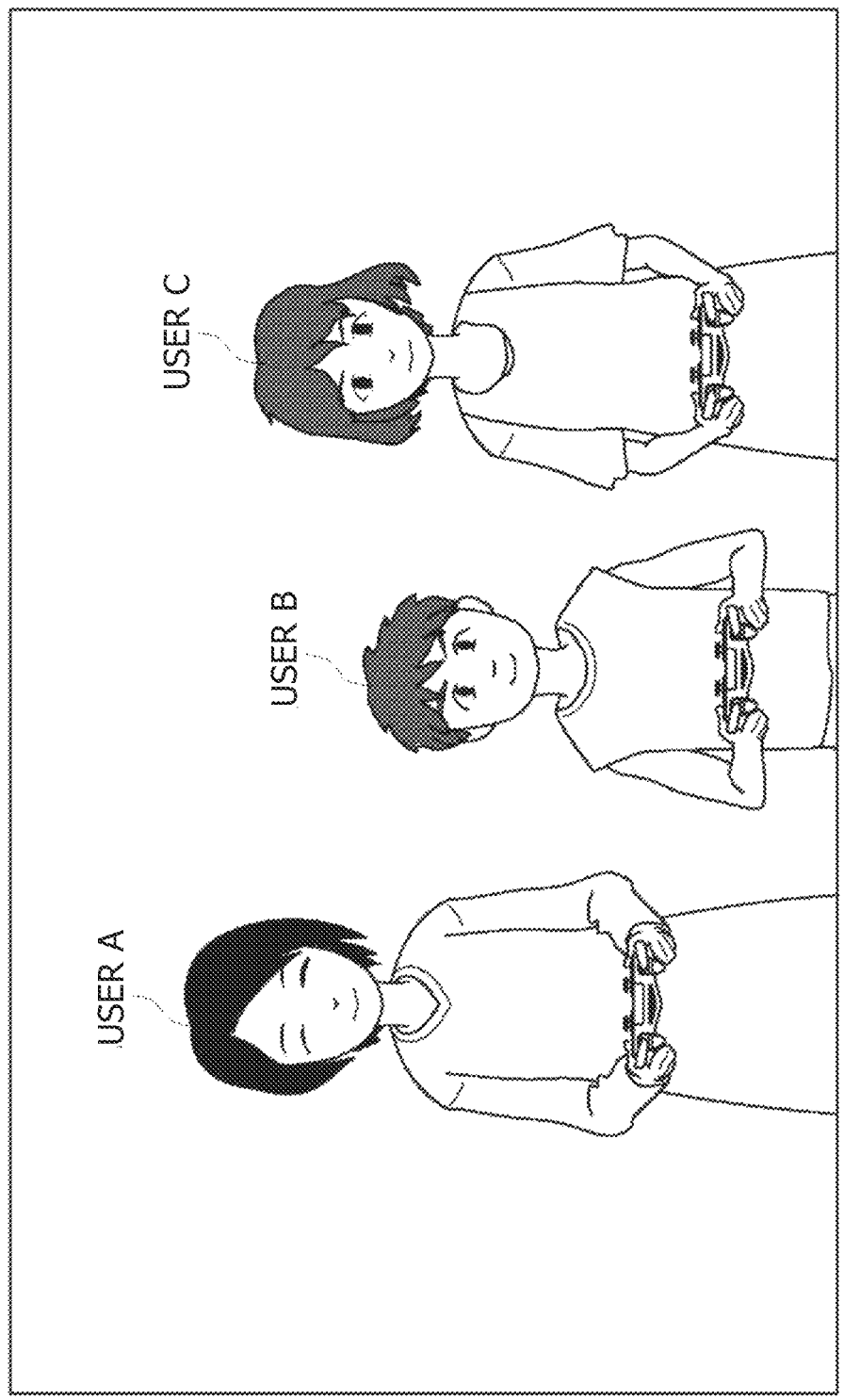
FIG. 9 is a diagram illustrating an example of a space photographed by a camera.

FIG. 9 illustrates an example of a space photographed by the camera 7. There are three users A to C in the photographed space. A quadrangular frame surrounding the three users in FIG. 9 represents an imaging range (angle of view) of the camera 7. The imaged image obtaining section 120 obtains imaged image data from the camera 7. For example, the camera 7 images the space periodically (for example at intervals of 1/30 of a second), and provides the imaged image to the imaged image obtaining section 120 via the USB module 34. The face recognizing section 122 detects face images of the plurality of users in the imaged image. Here, the face recognizing section 122 detects and extracts part estimated to be the face of a human in the imaged image, derives feature quantity data of the part, compares the feature quantity data with the face identifying data retained in the registered user information retaining section 170, and determines whether or not the extracted face is the face of a registered user.

Specifically, the face recognizing section 122 derives degrees of coincidence between the feature quantity data of the extracted user face image and the face identifying data of all of the registered users which face identifying data is retained in the registered user information retaining section 170. The degrees of coincidence are expressed by numerical values, and the degrees of coincidence are derived in the form of a score on a scale of 100, for example. When a degree of coincidence with the feature quantity data of a registered face image exceeds a score of 90, the face recognizing section 122 determines that the imaged user is a registered user, and identifies which registered user the imaged user is. Incidentally, when there are a plurality of degrees of coincidence exceeding the score of 90, it suffices for the face recognizing section 122 to determine that the imaged user is the registered user of face identifying data from which a highest score is derived. Incidentally, when none of the degrees of coincidence exceeds the score of 90 as a result of deriving the degrees of coincidence between the feature quantity data of the user face image extracted from the imaged image and the face identifying data of all of the registered users, the face recognizing section 122 determines that the user included in the imaged image is not a user whose face image is registered. The face recognizing section 122 thus detects the face image of the registered user present in the imaged image using the face identifying data retained in the registered user information retaining section 170. A known technology may be used as this face identifying technology.

Figure 10:
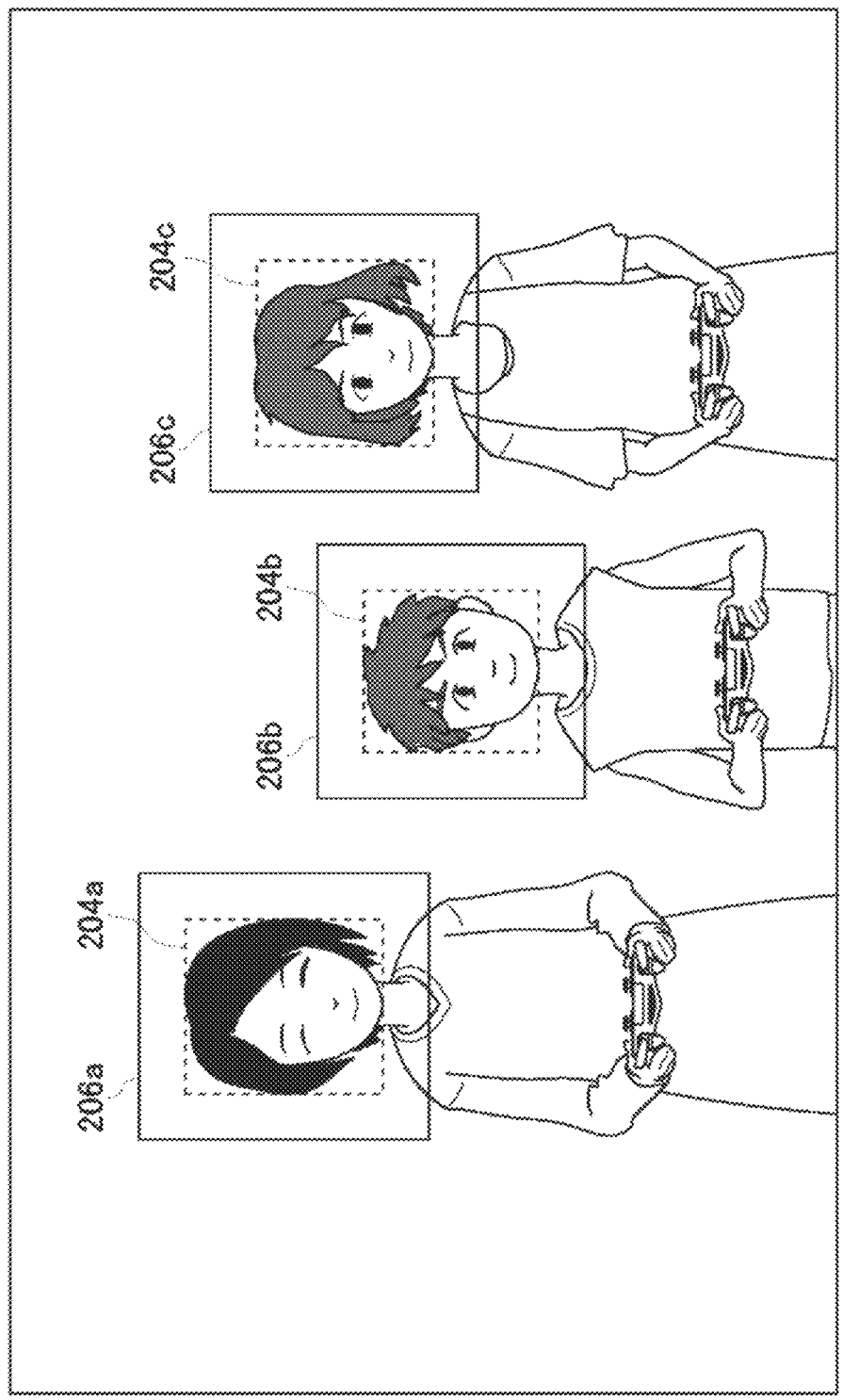
FIG. 10 is a diagram illustrating a result of face identification by a face recognizing section.

FIG. 10 illustrates a result of face identification by the face recognizing section 122. It is determined in this case that a user on a left side is the user A, that a user in a center is the user B, and that a user on a right side is the user C. The face recognizing section 122 sets, by coordinates in the camera image, a face region 204a indicating the position of the face of the user A in the imaged image, a face region 204b indicating the position of the face of the user B in the imaged image, and a face region 204c indicating the position of the face of the user C in the imaged image. Each of the face regions 204 may be set as a rectangular region circumscribing the face image of the user.

The face image generating section 140 generates a face image to be synthesized with the game screen. In the embodiment, in the case where the camera 7 photographs the plurality of users, the face image generating section 140 selects a face image of a user, and provides the face image to the display image generating section 160. The timing of the selection is when the user inputs a predetermined command. When the user inputs the predetermined command, the face image is selected according to display order determined in advance.

The order determining section 142 determines the display order of the plurality of users. For example, the user A who has given the instruction for the sharing processing is set as a first user, and the order of a second and subsequent users is set in decreasing order of size of the face regions 204. In the embodiment, all the users who play the game have logged in to the information processing device 10. The information processing device 10 thus manages the input devices 6 operated by the respective users and the users in association with each other. Therefore, the information processing device 10 grasps that the user who has operated the SHARE button 81 is the user A, and the order determining section 142 sets the user A as a first user in the order. The order determining section 142 next compares the sizes of the face regions 204b and 204c of the other users, that is, the users B and C, and sets the order of the other users in decreasing order of the sizes. For example, when the face region 204c is larger than the face region 204b, the order determining section 142 sets the user C as a second user in the order, and sets the user B as a third user in the order. The sizes of the face regions 204 may be compared with each other in terms of area. A fact that a user more excited by the game tends to play at a position closer to the output device 4 is utilized in giving a user having a larger face region 204 a higher ranking in the display order. A user having a larger face region 204 is considered to be playing at a position correspondingly closer to the output device 4, and is therefore given a higher ranking in the display order.

Incidentally, in the present example, all of the users A to C have face images thereof registered, and the face recognizing section 122 identifies each of the users. However, some users do not register face images thereof. The order determining section 142 may therefore set the ranking of a user whose face image is registered higher than the ranking of a user whose face image is not registered. In addition, the order determining section 142 may set the ranking of a user facing forward higher than the ranking of a user not facing forward. The orientations of faces of users may be detected by the face recognizing section 122 and notified to the order determining section 142. In addition, the order determining section 142 may set the rankings in order of decreasing distance on the basis of actual measured values of distances from the camera 7. The camera 7 is a stereo camera. Thus, the order determining section 142 may obtain the distances between the camera 7 and users from two imaged images, and determine the order of the users.

Incidentally, the imaged image may include not only the playing users but also users who merely watch the game play. The face recognizing section 122 detects also the face images of such users and sets face regions 204 in the imaged image. The order determining section 142 uses the face regions 204 as objects for the display ranking. The face recognizing section 122 may detect whether there is an input device 6 below a detected face of a user, and determine that the user is a playing user when there is an input device 6 below the detected face of the user and that the user is a non-playing user when there is no input device 6 below the detected face of the user. At this time, the order determining section 142 may set the ranking of a playing user higher than the ranking of a non-playing user. Incidentally, in the above-described example, the first display order is set to the user A who has operated the SHARE button 81. However, the order determining section 142 may determine the display orders of the plurality of users in order of size of the face regions 204 or decreasing order of actually measured distance from the camera 7.

The face image clipping section 148 sets clipping regions 206a to 206c of the respective users on the basis of the face regions 204a to 204c set by the face recognizing section 122. This clipping region 206 is a region clipped from the imaged image when superimposed on the game screen, and is set as a region including the face region 204 of one user and larger than the face region 204. The clipping region 206 is desirably set as a rectangular region formed by expanding the face region 204 in a vertical direction and a horizontal direction. Setting the clipping region 206 as a region larger than the face region 204 enables the face to be surely photographed within the clipping region 206 even when the user slightly moves the face.

The face recognizing section 122 ideally performs tracking processing (tracking) of the face of the user at all times. However, because face recognition processing imposes a heavy CPU load, the tracking processing may not be easy depending on CPU power. Therefore, when the face recognizing section 122 does not track the face of the user, the face image clipping section 148 may fix the set clipping regions 206a to 206c, and clip the face images of the users. Also for this reason, the face image clipping section 148 desirably sets the clipping region 206 larger.

Suppose in the following that the order determining section 142 ranks the user A as a first user, the user C as a second user, and the user B as a third user. Incidentally, in the embodiment, the face recognizing section 122 identifies the user on the left side in the imaged image as the user A, the user in the center as the user B, and the user on the right side as the user C, and therefore the order determining section 142 can rank the user A as the first user, the user C as the second user, and the user B as the third user. However, as already described, a user who is not playing or a user whose face image is not registered may be included in the imaged image, and the imaged user may not be identifiable. Accordingly, the order determining section 142 does not need to actually identify the users, but it suffices for the order determining section 142 to rank the user of the detected face region 204*a* as the first user, the user of the detected face region 204*c* as the second user, and the user of the detected face region 204*b* as the third user. In the following, for the convenience of description, the user of the detected face region 204*a* will be referred to as the user A, the user of the face region 204*c* will be referred to as the user C, and the user of the face region 204*b* will be referred to as the user B.

The display user determining section 144 determines a user to be included in the display image generated by the display image generating section 160. Here, the display user determining section 144 determines the user to be superimposed on the game screen according to the display order determined by the order determining section 142. The face image clipping section 148 clips a region including the face image of the user determined by the display user determining section 144 from the imaged image. The display image generating section 160 generates a display image including the clipped region.

Specifically, when the sharing processing is started, the display user determining section 144 first determines, as a display user, the user A whose ranking is set to be the first, and notifies the face image clipping section 148 that the user A is determined as a display user. The face image clipping section 148 clips the clipping region 206*a* of the user A from the imaged image, and provides the clipping region 206*a* of the user A to the display image generating section 160. The display image generating section 160 is also provided with a game image from the application image generating section 108. The display image generating section 160 generates a display image in which the clipped camera video is superimposed on a region on the game video according to the mode of superimposition of the camera video which mode is set in the sharing processing section 162. The generated display image is output from the output device 4, and is distributed by the sharing processing section 162 to the shared server 11 via the communicating section 102.

Figure 11:
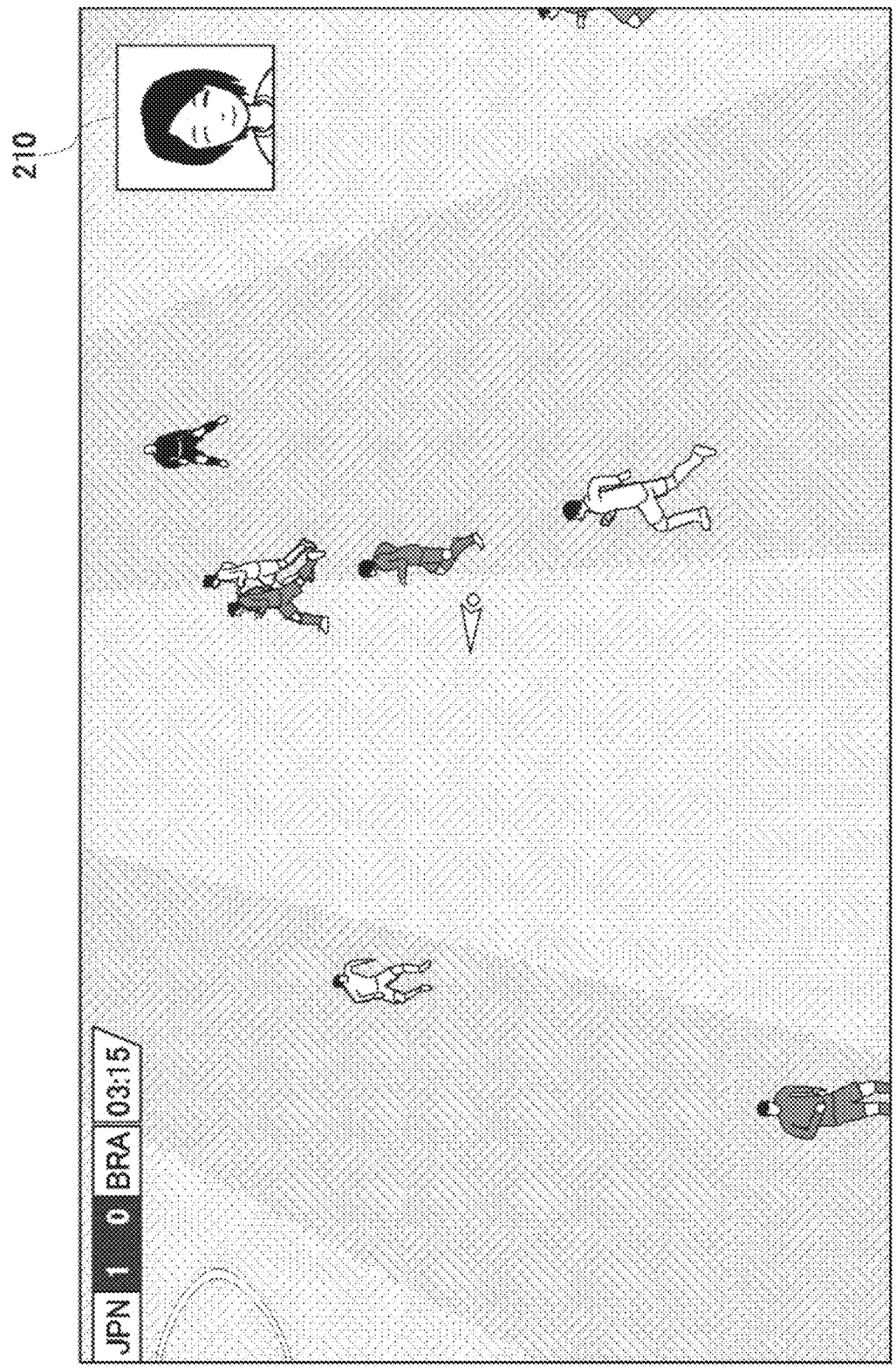
FIG. 11 is a diagram illustrating the game screen on which the camera video of a user A is superimposed.

FIG. 11 illustrates the game screen on which the camera video of the user A is superimposed. A display region 210 specified by the mode of superimposition of the camera video displays the clipped camera video of the user A. This game screen is displayed on the output device 4, and is also distributed to the terminal devices 9 via the shared server 11. The viewing users in the information processing system 1 can thus view the same game screen as that viewed by the users playing the game.

Referring to FIG. 4, the voice obtaining section 130 obtains voice input to the microphone 110. The users A to C playing the game can change the camera video displayed in the display region 210 by uttering a command. The users who give the utterance may be any users, and may be users other than the playing users A to C.

The voice recognizing section 132 analyzes the voice obtained by the voice obtaining section 130, and determines whether the voice represents a predetermined command. A voice recognizing function of the voice recognizing section 132 is configured to detect predetermined words by the user, for example an utterance of "VOICE RECOGNITION ON," and is configured to be enabled, by detecting the utterance of "VOICE RECOGNITION ON," to recognize another voice (words) during a predetermined time period. That is, after detecting the utterance of "VOICE RECOGNITION ON," the voice recognizing section 132 analyzes a voice obtained by the voice obtaining section 130 within the predetermined time period. For example, a voice command for changing the camera video is "SEARCH FOR FACE."

When the voice recognizing section 132 detects that the user has uttered "SEARCH FOR FACE," the voice recognizing section 132 recognizes the utterance as the voice command, and notifies the instruction receiving section 146 that the voice command is input. When the instruction receiving section 146 is notified that the voice command is input, the instruction receiving section 146 receives the voice command as an instruction to change the user included in the display image. When the instruction receiving section 146 receives the changing instruction, the display user determining section 144 makes a determination so as to change the user included in the display image on the basis of the changing instruction. Specifically, the display user determining section 144 determines the user to be included in the display image according to the display order determined by the order determining section 142.

The display user determining section 144 determines, as a display user, the user subsequent to the user being displayed. Specifically, the display user determining section 144 determines, as a display user, the user C subsequent to the user A. The determined display user is notified to the face image clipping section 148. The face image clipping section 148 clips the clipping region 206*c* including the face image of the user C from the imaged image, and provides the clipping region 206*c* to the display image generating section 160. The display image generating section 160 generates a display image by embedding the camera video of the clipping region 206*c* in the imaged image into the display region 210 in the game screen.

Figure 12:
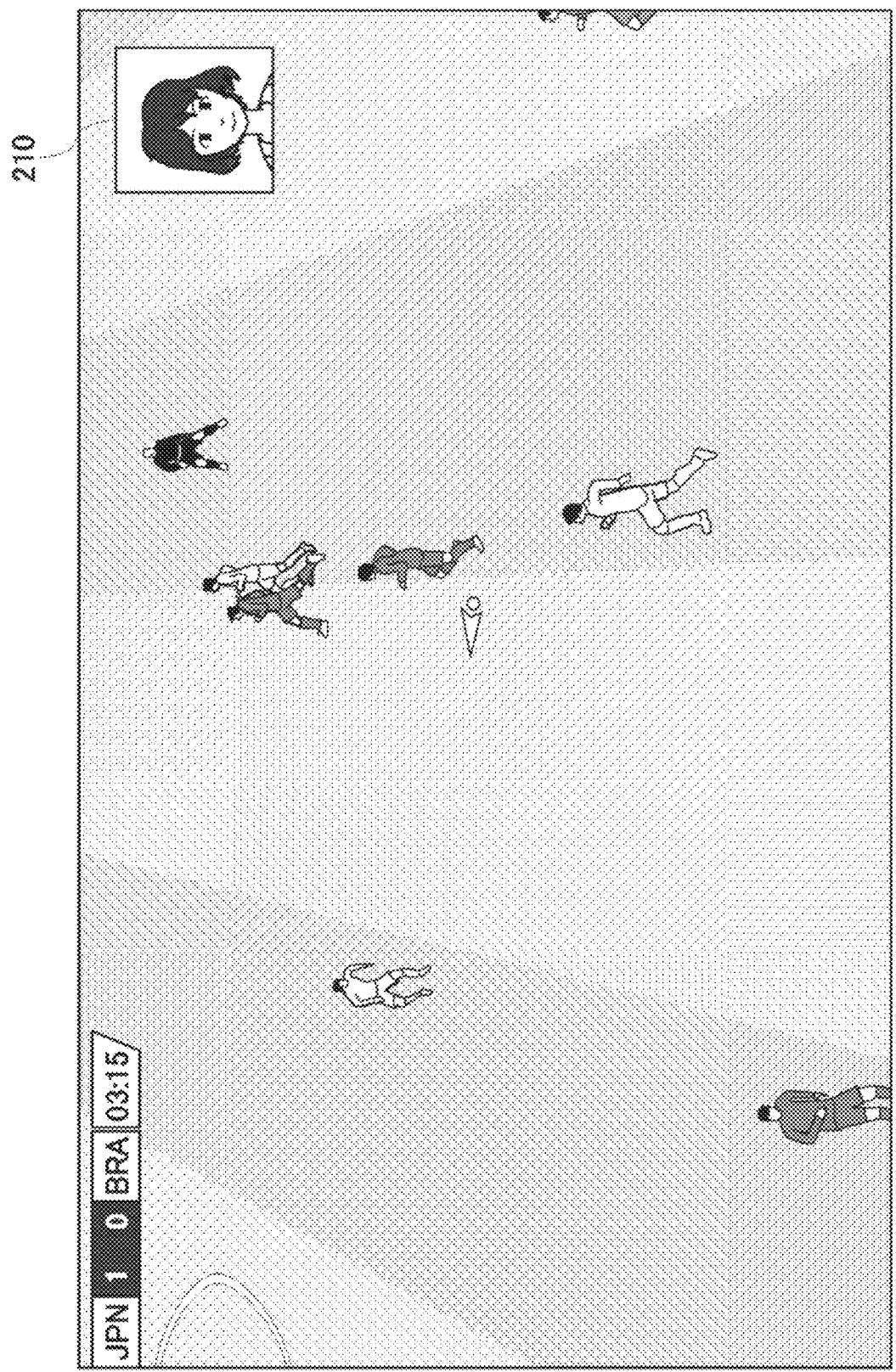
FIG. 12 is a diagram illustrating the game screen on which the camera video of a user C is superimposed.

FIG. 12 illustrates the game screen on which the camera video of the user C is superimposed. The display region 210 displays the clipped camera video of the user C. This game screen is displayed on the output device 4, and is also distributed to the terminal devices 9 via the shared server 11.

When the voice recognizing section 132 detects that a voice obtained by the voice obtaining section 130 is "SEARCH FOR FACE" in the state in which the game screen illustrated in FIG. 12 is displayed, the voice recognizing section 132 notifies the instruction receiving section 146 that the voice command is input. When the instruction receiving section 146 is notified that the voice command is input, the instruction receiving section 146 receives the voice command as an instruction to change the user included in the display image, and the display user determining section 144 makes a determination so as to change the user included in the display image on the basis of the order determined by the order determining section 142. The display user determining section 144 determines, as a display user, the user subsequent to the user being displayed. Specifically, the display user determining section 144 determines, as a display user, the user B subsequent to the user C. The determined display user is notified to the face image clipping section 148. The face image clipping section 148 clips the clipping region 206*b* including the face image of the user B from the imaged image, and provides the clipping region 206*b* to the display image generating section 160. The display image generating section 160 generates a display image by embedding the camera video of the clipping region 206*b* in the imaged image into the display region 210 in the game screen.

Figure 13:
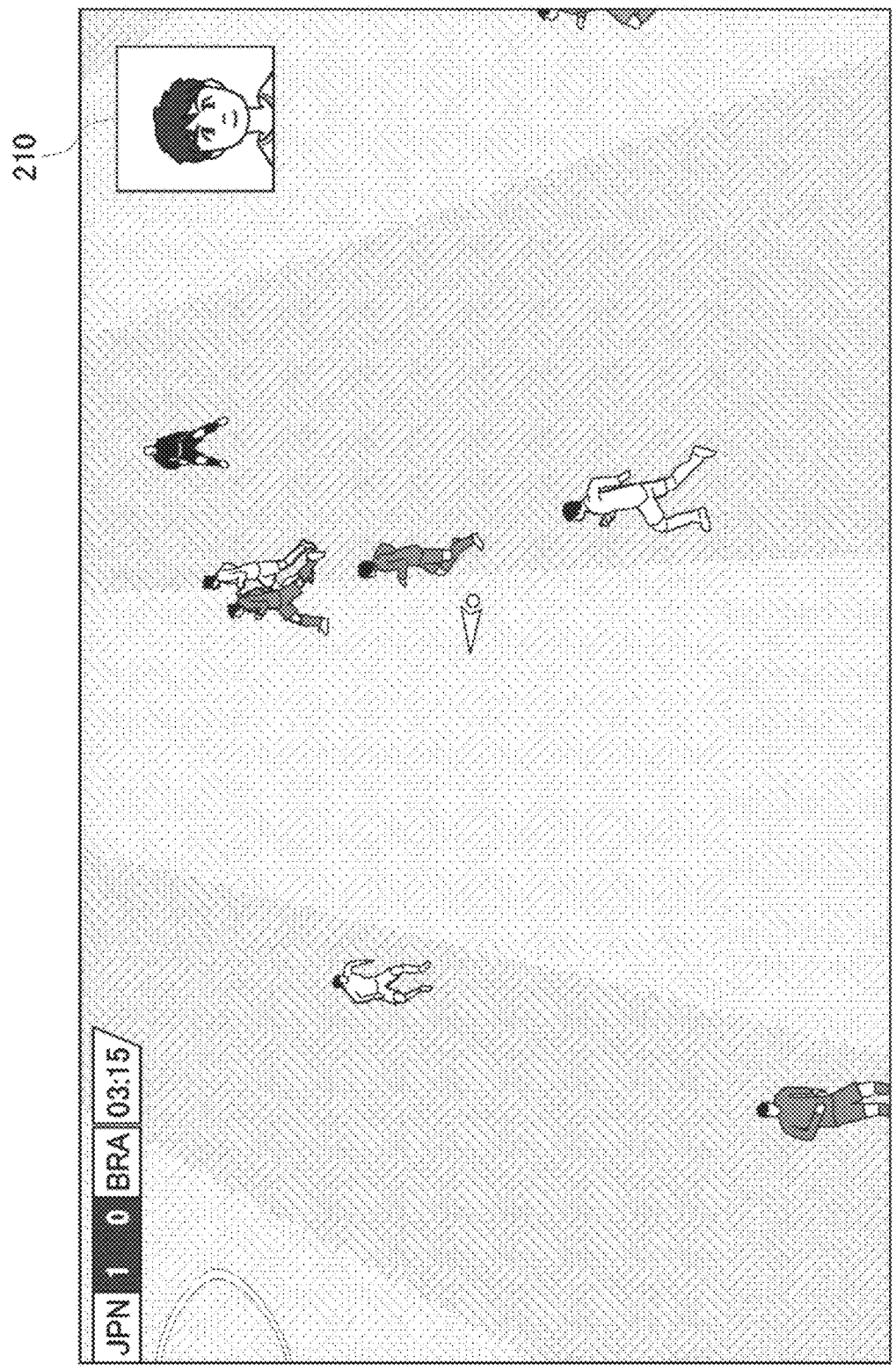
FIG. 13 is a diagram illustrating the game screen on which the camera video of a user B is superimposed.

FIG. 13 illustrates the game screen on which the camera video of the user B is superimposed. The display region 210 displays the clipped camera video of the user B. When the voice recognizing section 132 detects that a voice obtained by the voice obtaining section 130 is "SEARCH FOR FACE" in this state, the voice recognizing section 132 notifies the instruction receiving section 146 that the voice command is input. When the instruction receiving section 146 is notified that the voice command is input, the instruction receiving section 146 receives the voice command as an instruction to change the user included in the display image, and the display user determining section 144 makes a determination so as to change the user included in the display image on the basis of the order determined by the order determining section 142. The display user determining section 144 determines the subsequent user as a display user. However, when there is no subsequent user, the display user determining section 144 returns to a start, and determines a display user. That is, when the user being displayed is the user C, there is no user subsequent to the user C. Thus, the first user A is determined as a display user. The face image clipping section 148 clips the clipping region 206a of the user A from the imaged image. The display image generating section 160 generates a display image by embedding the camera video of the clipping region 206a in the imaged image into the display region 210 in the game screen.

The user can thus change the displayed camera video easily. The viewing users can thereby view the state of various users present in a play environment, and feel the atmosphere of the play environment. In addition, because the camera video is changed by the voice command, the user can use the input device 6 while concentrating on game operation, and can easily realize an operation of changing the camera video. In a game that involves quick game operation, in particular, it may be expected to be difficult to give an instruction to change the camera video by the input device 6. Thus, being able to generate the changing instruction by the voice command has great significance.

On the other hand, the instruction receiving section 146 may receive a predetermined operation on the input device 6 as an instruction to change the camera video. Using a predetermined operation on the input device 6 as an instruction to change the camera image is effective in a case where the information processing device 10 does not have the microphone 110, so that the voice recognizing section 132 cannot receive voice commands.

In the above description, the coordinates of the set clipping regions 206a to 206c are fixed, and the clipping region 206 included in the display image is sequentially changed according to the instruction to change the camera video. In the case where the voice recognizing function of the voice recognizing section 132 is configured to, after the user utters predetermined words, analyze another utterance as voice during a predetermined time period, when an utterance of "SEARCH FOR FACE" by the user is detected during a start of the voice recognizing function, the utterance is recognized as a voice command, and the clipping region 206 included in the display image is changed. On the other hand, when an utterance of "SEARCH FOR FACE" by the user is detected after the voice recognizing function is ended with the passage of the predetermined time period, and the user starts the voice recognizing function again by uttering the predetermined words, an instruction to perform face recognition processing may be notified to the face recognizing section 122 so that the face recognizing section 122 performs face recognition processing again and resets the face regions 204 of the users. At this time, the order determining section 142 may determine the display order of the plurality of users again, and the face image clipping section 148 may reset the clipping regions 206.

Incidentally, when there is sufficient CPU power, the face recognizing section 122 desirably tracks the faces of the users and updates the face regions 204 at all times. In this case, the face image clipping section 148 may obtain the coordinates of the face regions 204 from the face recognizing section 122, and dynamically set the clipping regions 206 according to the face regions 204. Also in the case where the tracking processing is performed, the display order determined by the order determining section 142 is fixed, and the camera video is changed in the same manner in the order of the user A, the user C, and the user B.

Incidentally, in the case where the tracking processing is performed, the face recognizing section 122 can detect a change in configuration of the users being photographed. For example, there is a case where the user C disappears from within the angle of view of the camera 7, or a new user D enters the angle of view of the camera 7. When the user configuration is changed, it is desirable that the face recognizing section 122 notify details of the change to the face image generating section 140, and that thereby the order determining section 142 update the display order and the face image clipping section 148 reset the clipping regions 206.

In addition, while description has been made of a case where a plurality of users are photographed in the embodiment, there is a case where only one user is photographed. In the case where the tracking processing by the face recognizing section 122 is not performed, when the voice recognizing section 132 detects that a voice obtained by the voice obtaining section 130 is "SEARCH FOR FACE," the voice recognizing section 132 notifies the instruction receiving section 146 that the voice command is input, and notifies an instruction to perform face recognition processing to the face recognizing section 122. That is, in the case where the one user is photographed, face recognition processing by the face recognizing section 122 may be performed again so that an appropriate clipping region 206 is reset, and the face image clipping section 148 may set an appropriate clipping region 206 on the basis of an updated face region 204.

Incidentally, after the face image clipping section 148 clips the imaged image in the clipping region 206, the face image clipping section 148 may manipulate the clipped image. The face image clipping section 148 may manipulate the camera video of the clipping region 206 according to the contents of the "BACKGROUND" item and the "EFFECT" item which contents are input on the setting screen for the mode of superimposition of the camera video, the setting screen being illustrated in FIG. 8.

In addition, some users do not desire the distribution of face images of the users. Such a user may register information to the effect that the user does not desire the distribution in the registered user information retaining section 170 in advance, and when the display user determining section 144 determines the user who does not desire the distribution as a display user, the face image clipping section 148 may provide the display image generating section 160 with an icon, an avatar, or the like of the user in place of the clipping region 206 of the user.

Incidentally, in the above-described example, description has been made of a case where the face images of the users are selected according to the display order determined by the order determining section 142. The selection of the face images of the users may be performed by designating information explicitly identifying the users. When the instruction receiving section 146 receives an instruction designating a user, the display user determining section 144 determines the inclusion of the designated user in the display image.

Suppose for example that the user name of the user A is "Kate," that the user name of the user B is "David," and the user name of the user C is "Lucy." When the camera video of the user C is desired to be distributed, and someone utters "Lucy," the voice recognizing section 132 detects that the uttered voice is "Lucy," and notifies the detected "Lucy" to the instruction receiving section 146. The instruction receiving section 146 receives the detected "Lucy" as an instruction to designate the user. The display user determining section 144 determines the user C, who is "Lucy," as a display user. The face image clipping section 148 clips the clipping region 206c of the user C, and provides the clipping region 206c to the display image generating section 160. Thus, a user can himself/herself designate a user desired to be displayed.

Incidentally, the display user determining section 144 may issue identifying words to the users being photographed rather than the user names, and determine the display user according to the identifying words. For example, identifying words of "PLAYER 1" are set to the user A, identifying words of "PLAYER 2" are set to the user B, and identifying words of "PLAYER 3" are set to the user C. As an example, the numbers may be set in order in which the input devices 6 are connected to the information processing device 10. When the voice recognizing section 132 detects that an uttered voice is "PLAYER 3," and notifies the detected "PLAYER 3" to the instruction receiving section 146, the instruction receiving section 146 receives the detected "PLAYER 3" as an instruction to designate the user. The display user determining section 144 determines the user C, who is "PLAYER 3," as a display user. The identifying words are desirably words for which the voice recognizing section 132 achieves a high recognition accuracy.

Incidentally, the user names and the identifying words described above are desirably displayed on the screen so as to be recognizable by the users.

Figure 14:
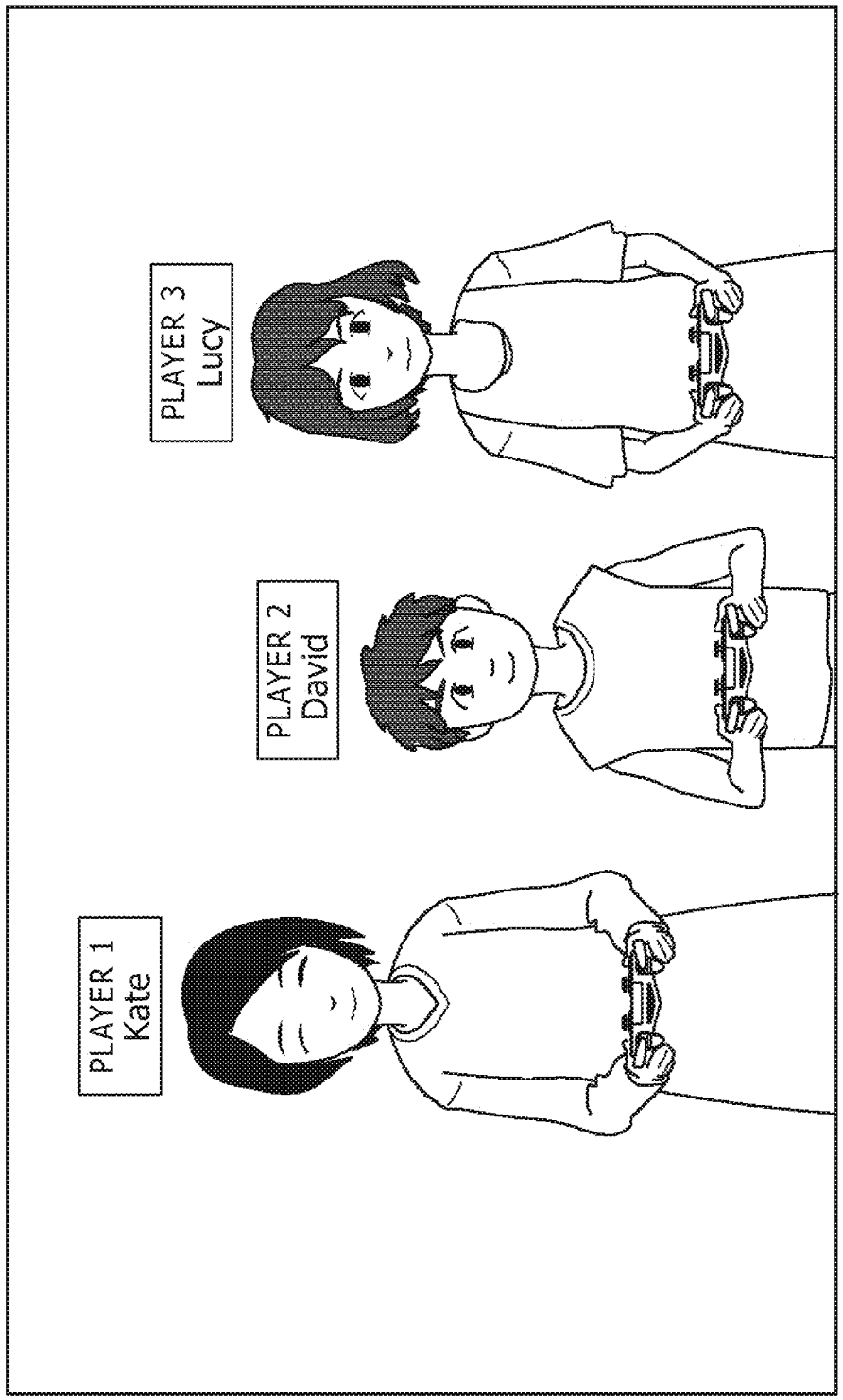
FIG. 14 is a diagram illustrating an example of screen display of user names and identifying words.

FIG. 14 illustrates an example of screen display of the user names and the identifying words. This screen is displayed on the output device 4 immediately after face recognition processing by the face recognizing section 122 is completed, for example. In the present example, the user names and the identifying words are both displayed. However, either only the user names or only the identifying words may be displayed. The users can check the user names or the identifying words by viewing the screen, and can efficiently change the distributed user face image by uttering a user name or an identifying word during game play.

Incidentally, in order for the users to be able to check the user names or the identifying words even during game play, these pieces of information may be displayed in a small size in an inconspicuous region such as a space below the game screen or the like.

In addition, in the embodiment, description has been made of a case where the display user is changed on the basis of a voice command from a user (or operation information of the input device 6). However, the display user determining section 144 can determine the display user regardless of the command from a user. As an example, the display user determining section 144 may determine the display user at intervals of a fixed time period according to the display order of the plurality of users which display order is determined by the order determining section 142. For example, the display user determining section 144 changes the display user at intervals of ten seconds. In this case, the viewing users of the terminal devices 9 can equally view the states of all the users involved in game play, and therefore feel the atmosphere of the environment in which the users are playing.

Incidentally, the sharing processing section 162 may distribute the display image generated by the display image generating section 160 with various information added to the display image. For example, personal information such as user IDs, user names, ages, trophy levels, and the like as well as information such as the number of users photographed by the camera 7 or the like may be added as information about the users included in the display image. These pieces of information may be distributed in a state of being superimposed as text data on the display image, or may be distributed in a state of being added as metadata to the display image.

The user IDs and the user names are useful as information identifying the users included in the camera video. Incidentally, when all of the user IDs and the user names photographed by the camera 7 are distributed, the viewing users can realize the presence of users not included in the camera video. This leads also to conveying the atmosphere of the play environment. Similarly, the information about the number of users is information notifying the viewing users how many people are gathering. Thus, when there are a large number of people, the viewing users can be made to presume that the people are in a lively atmosphere. Ages and trophy levels serve as information for the viewing users to determine whether users at the same level as the viewing users are playing. In a case where ages and trophy levels are distributed as metadata, for example, the ages and the trophy levels can also be used as search keys when the viewing users select distributed game video on the shared server 11.

When a user does not like the camera video being displayed, the user can instruct the face image clipping section 148 to replace the camera video being displayed with another image. This instruction may be given by a voice command or operation information of the input device 6, and the replacement may be allowed to be made with for example an image photographed in the past, camera video distributed in the past, or an icon, an avatar, or the like of the user, as already described.

The present invention has been described above on the basis of an embodiment thereof. The present embodiment is illustrative, and it is to be understood by those skilled in the art that combinations of constituent elements and processing processes of the embodiment are susceptible of various modifications, and that such modifications also fall within the scope of the present invention. In the embodiment, description has been made mainly of a case where the face image of a user is displayed in a state of being superimposed on the game screen. However, the face image of the user may be displayed in a region separate from the game screen. In addition, description has been made of a case where the changing instruction is given by a voice command or operation information of the input device 6. However, the changing instruction may be given by a predetermined gesture of a user.

In addition, in the embodiment, description has been made of a case where the face image of one user is distributed. However, the face images of a plurality of users may be distributed to effectively convey the atmosphere of the users during play.

Figure 15:
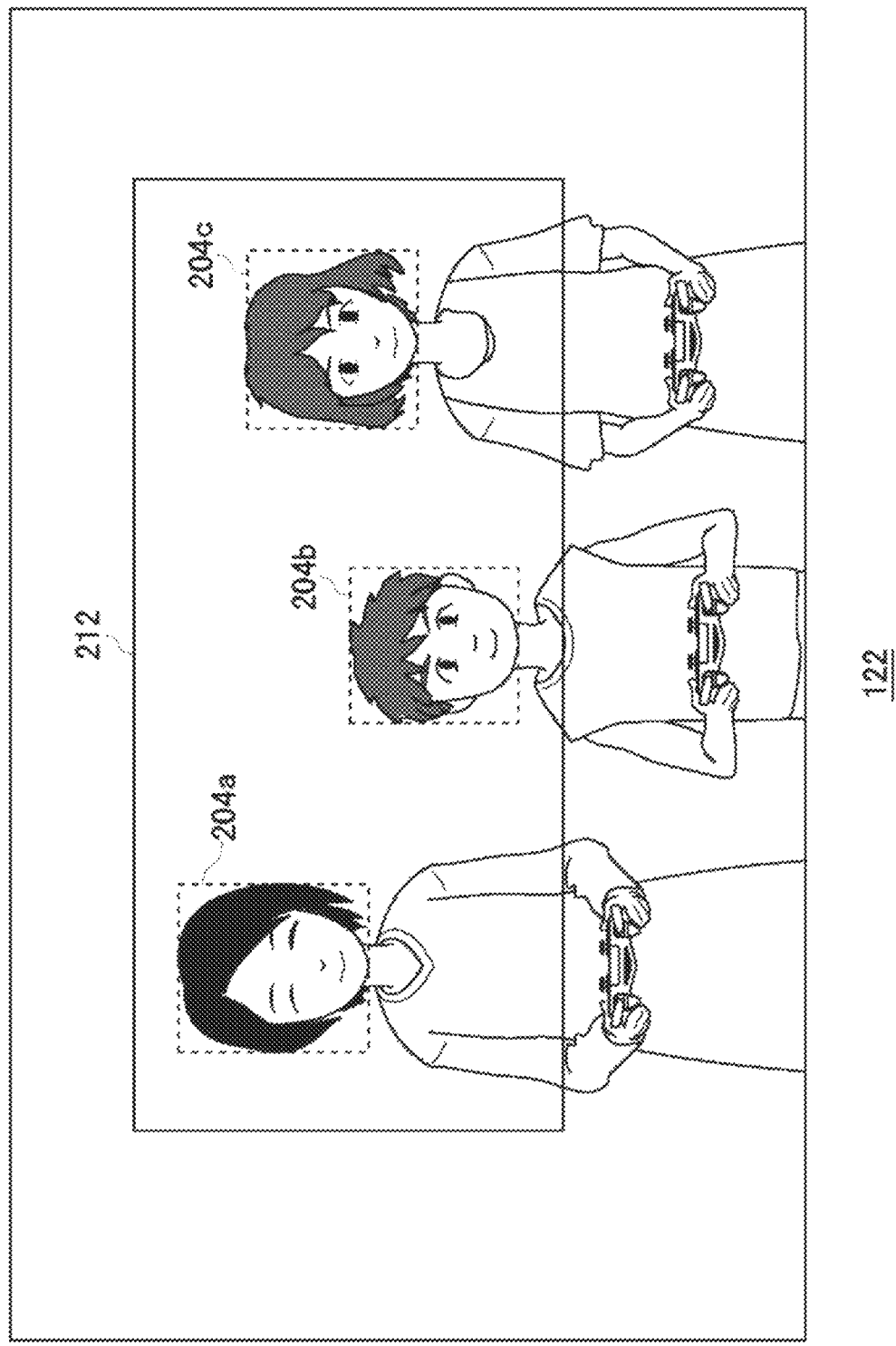
FIG. 15 is a diagram illustrating a result of face identification by the face recognizing section.

FIG. 15 illustrates a result of face identification by the face recognizing section 122. As illustrated also in FIG. 10, the face recognizing section 122 sets, by coordinates in the camera image, a face region 204a indicating the position of the face of the user A in the imaged image, a face region 204b indicating the position of the face of the user B in the imaged image, and a face region 204c indicating the position of the face of the user C in the imaged image.

The face image clipping section 148 sets a clipping region 212 including the face regions 204a to 204c of all of the users on the basis of the face regions 204a to 204c set by the face recognizing section 122. The clipping region 212 includes the face images of all of the users, and is therefore suitable for expressing the atmosphere during play.

Figure 16:
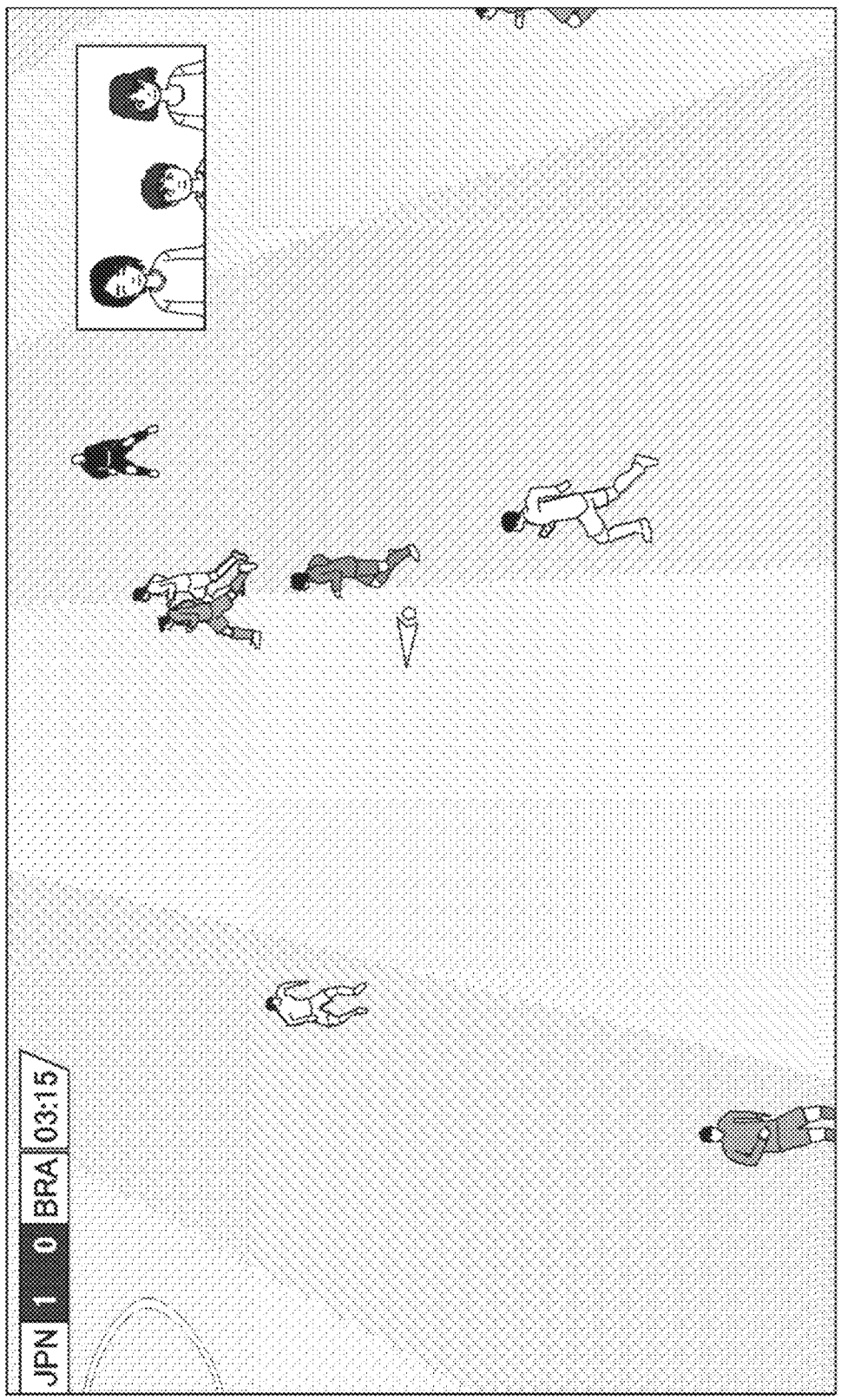
FIG. 16 is a diagram illustrating the game screen on which the camera video including all of the users is superimposed.

FIG. 16 illustrates the game screen on which camera video including all of the users is superimposed. By viewing this camera video, the viewing users can easily imagine the atmosphere in which the game is being played. Incidentally, when the camera video including all of the users is superimposed, the aspect ratio is desirably set "WIDE" on the setting screen illustrated in FIG. 8.

In one example, the order determining section 142 may determine the display order of the clipping region 212 including the face images of all of the users and the clipping regions 206 of the respective users. As described in the embodiment, the order determining section 142 ranks the user A as a first user, the user C as a second user, and the user B as a third user, and sets all of the users A, B, and C as fourth users. Thus, the camera video of the clipping region 206a of the user A, the camera video of the clipping region 206c of the user C, the camera video of the clipping region 206b of the user B, and the camera video of the clipping region 212 of the users A, B, and C are displayed in this order on the upper right of the game screen. A user can easily select the camera video of the individual users and the camera video including the plurality of users by merely uttering "SEARCH FOR FACE."

In another example, the instruction receiving section 146 receives a voice command that determines whether to include one user in the camera video to be distributed (single mode) or all of the users in the camera video (multiple mode). A voice command to designate the single mode is "SINGLE." A voice command to designate the multiple mode is "ALL." When the voice recognizing section 132 detects that an uttered voice is "SINGLE," and notifies the detected voice to the instruction receiving section 146, the instruction receiving section 146 receives the selection of the single mode, and the display user determining section 144 determines a display user in the single mode. A method of determining a display user in the single mode is as described in the embodiment. On the other hand, when the voice recognizing section 132 detects that an uttered voice is "ALL," and notifies the detected voice to the instruction receiving section 146, the instruction receiving section 146 receives the selection of the multiple mode, and the display user determining section 144 notifies the face image clipping section 148 that the multiple mode is selected. Thus, the face image clipping section 148 clips the clipping region 212 illustrated in FIG. 15 from the imaged image, and provides the clipping region 212 to the display image generating section 160.

In the embodiment, a playing user or a user present in the play environment determines a user to be included in the display image by a voice command or operation information of the input device 6. However, in a modification, a user of a terminal device 9 may be allowed to determine a user to be included in the display image. Particularly in a case where the terminal device 9 is a terminal identical to the information processing device 10, and is performing two-way communication, a command can be directly transmitted from the terminal device 9 to the information processing device 10, and the command can be externally input to the display user determining section 144.

For example, in a case where the information processing device 10 and the terminal device 9 are performing a voice chat, when the terminal device 9 and the user utter "SEARCH FOR FACE," the voice output from the speaker of the information processing device 10 is picked up by the microphone 110. Thus, the instruction receiving section 146 may receive the voice as a changing instruction, and the display user determining section 144 may change the display user.

In addition, in the case where user IDs, user names, or the like are added to the distribution image as already described, the user of the terminal device 9 may transmit a changing instruction designating a user ID or a user name to the information processing device 10. In addition, the user of the terminal device 9 may be allowed to transmit the changing instruction by designating a character in the game rather than a user name. When the user of the terminal device 9 utters "SEARCH FOR FORWARD" in the voice chat, the game may identify a user operating a forward, and the user ID of the user may be notified to the display user determining section 144 via the instruction receiving section 146, so that the display user determining section 144 may determine the user operating the forward as a display user. When the function of notifying a user name to the face image generating section 140 is thus incorporated on the game side, a viewing user can designate a user included in the camera video by designating a character in the game.

In addition, in a case where there is a remote user who remotely accesses the information processing device 10 and participates in the game by using another terminal device, the user of the terminal device 9 may be able to designate the remote user. This remote user is not included in the image imaged by the camera 7. Thus, the display user determining section 144 transmits a camera start request to the terminal device of the remote user. The terminal device starts a camera, and transfers a photographed image to the information processing device 10. Then, the face image clipping section 148 clips a face image of the remote user, and provides the face image to the display image generating section 160. Incidentally, the remote user may transmit the photographed image from another terminal such as a smart phone or the like to the information processing device 10.

REFERENCE SIGNS LIST

1 . . . Information processing system, 4 . . . Output device, 6 . . . Input device, 7 . . . Camera, 9 . . . Terminal device, 10 . . . Information processing device, 11 . . . Shared server, 100 . . . Processing section, 102 . . . Communicating section, 104 . . . Receiving section, 106 . . . Application executing section, 108 . . . Application image generating section, 110 . . . Microphone, 120 . . . Imaged image obtaining section, 122 . . . Face recognizing section, 130 . . . Voice obtaining section, 132 . . . Voice recognizing section, 140 . . . Face image generating section, 142 . . . Order determining section, 144 . . . Display user determining section, 146 . . . Instruction receiving section, 148 . . . Face image clipping section, 160 . . . Display image generating section, 162 . . . Sharing processing section, 170 . . . Registered user information retaining section

INDUSTRIAL APPLICABILITY

The present invention is applicable to technical fields in which the camera video of a user is distributed.

The invention claimed is:
1. An information processing device comprising:
an image obtaining section configured to obtain an imaged image from an imaging device, where the imaged image includes elements of a plurality of users, each of the plurality of users being located in a same real space and engaging in an interactive exchange with an application executing on the information processing device;

a face recognizing section configured to detect respective face images of the plurality of users in the imaged image;

a display user determining section configured to determine a determined user among the plurality of users to be included in a display image;

a face image clipping section configured to clip a region including the face image of the determined user from the imaged image;

a display image generating section configured to generate the display image including the clipped region; and an instruction receiving section configured to receive an instruction from one of the plurality of users;

wherein the display user determining section determines the determined user to be included in the display image on a basis of the instruction received by the instruction receiving section.

2. The information processing device according to claim 1, wherein the face image clipping section clips the region including the face image of one user.

3. The information processing device according to claim 1, wherein the instruction receiving section receives a changing instruction of a user included in the display image, and the display user determining section determines the user to be included in the display image on a basis of the changing instruction.

4. The information processing device according to claim 3, further comprising an order determining section configured to determine display order of the plurality of users, wherein when the instruction receiving section receives the changing instruction of the user, the display user determining section determines the user according to the display order.

5. The information processing device according to claim 1, wherein when the instruction receiving section receives an instruction that designates a user, the display user determining section determines that the designated user is to be included in the display image.

6. The information processing device of claim 1, wherein:
the instruction receiving section is configured to receive a predetermined voice command as a changing instruction of the determined user among the plurality of users to be included in the display image; and
the display user determining section is configured to determine the user to be included in the display image on a basis of the changing instruction.

7. The information processing device according to claim 1, wherein the display image generating section generates the display image in which an application image is disposed in a first region and the clipped region is disposed in a second region.

8. The information processing device according to claim 7, wherein the display image generating section sets the second region within the first region.

9. The information processing device according to claim 7, wherein the display image generating section sets the first region and the second region such that the first region and the second region are not superimposed on each other.

10. The information processing device according to claim 1, wherein the face image clipping section clips a region including the face images of the plurality of users.

11. A non-transitory, computer readable storage medium containing a computer program, which when executed by a computer, causes the computer to carry out actions, comprising:

obtaining an imaged image from an imaging device, where the imaged image includes elements of a plurality of users, each of the plurality of users being located in a same real space and engaging in an interactive exchange with an application executing on the information processing device;

detecting respective face images of the plurality of users in the imaged image;

determining a determined user among the plurality of users to be included in a display image;

clipping a region including the face image of the determined user from the imaged image;

generating the display image including the clipped region; and receiving an instruction from one of the plurality of users;

wherein the determining includes determining the determined user to be included in the display image on a basis of the instruction received by the instruction receiving section.

* * * * *